US009854375B2

United States Patent
Stockhammer

(10) Patent No.: US 9,854,375 B2
(45) Date of Patent: Dec. 26, 2017

(54) SELECTION OF CODED NEXT GENERATION AUDIO DATA FOR TRANSPORT

(71) Applicant: QUALCOMM Incorporated, San Diego, CA (US)

(72) Inventor: Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/365,557

(22) Filed: Nov. 30, 2016

(65) Prior Publication Data
US 2017/0156015 A1    Jun. 1, 2017

Related U.S. Application Data

(60) Provisional application No. 62/261,743, filed on Dec. 1, 2015, provisional application No. 62/387,269, filed on Dec. 22, 2015.

(51) Int. Cl.
*H04S 3/00* (2006.01)
(52) U.S. Cl.
CPC .......... *H04S 3/006* (2013.01); *H04S 2400/01* (2013.01); *H04S 2420/11* (2013.01)
(58) Field of Classification Search
CPC .......... G10L 2019/0001; G10L 21/038; G10L 25/18; H04S 2400/03; H04S 2400/11;
(Continued)

(56) References Cited

U.S. PATENT DOCUMENTS 9,666,198 B2 * 5/2017 Hirvonen ................ G10L 19/20
2014/0365759 A1    12/2014 Wang et al.
(Continued)

FOREIGN PATENT DOCUMENTS

EP        2665262 A1    11/2013
WO    2016182371 A1    11/2016

OTHER PUBLICATIONS

3rd Generation Partnership Project: "Technical Specification Group Services and System Aspects, Multimedia Broadcast/Multicast Service (MBMS), Protocols and codecs (Release 13)", 3GPP Draft, 26346-D20, 3GPP, Mobile Competence Centre, 650, Route Des Lucioles, F-06921, Sophia Antipolis, Cedex, France , Sep. 21, 2015 (Sep. 21, 2015), XP051036651, 225 pages. Retrieved from the Internet: URL: http://www.3gpp.org/ftp/tsg_sa/WG4_CODEC/Specs_update_after_SA69/.

(Continued)

*Primary Examiner* — Mohammad Islam
(74) *Attorney, Agent, or Firm* — Shumaker & Sieffert, P.A.

(57) ABSTRACT

An example device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

39 Claims, 24 Drawing Sheets

(58) Field of Classification Search
CPC ..... H04S 2400/01; H04S 5/00; H04N 21/233; H04N 21/84; H04N 13/0048; H04N 19/132; G06F 17/16; H03G 11/008; H03G 9/005

See application file for complete search history.

(56) References Cited

U.S. PATENT DOCUMENTS

| | | | | |
|---|---|---|---|---|
| 2015/0142453 | A1* | 5/2015 | Oomen | G10L 19/008 704/500 |
| 2015/0149187 | A1* | 5/2015 | Kastner | G10L 19/008 704/500 |
| 2015/0332691 | A1* | 11/2015 | Kim | G10L 19/038 704/222 |
| 2015/0356975 | A1* | 12/2015 | Seo | G10L 19/008 381/17 |
| 2016/0007132 | A1* | 1/2016 | Peters | G10L 19/008 381/17 |
| 2016/0073215 | A1* | 3/2016 | De Bruijn | H04S 7/308 381/17 |
| 2016/0093308 | A1* | 3/2016 | Kim | G06F 17/10 381/22 |
| 2016/0104495 | A1* | 4/2016 | Peters | G10L 19/008 381/22 |
| 2016/0111099 | A1* | 4/2016 | Hirvonen | G10L 19/20 381/22 |
| 2016/0316309 | A1* | 10/2016 | Borss | H04S 3/02 |
| 2017/0011751 | A1* | 1/2017 | Fueg | H04N 21/439 |
| 2017/0013388 | A1* | 1/2017 | Fueg | H04S 7/301 |
| 2017/0063960 | A1 | 3/2017 | Stockhammer et al. | |
| 2017/0110139 | A1* | 4/2017 | Peters | G10L 19/008 |
| 2017/0171576 | A1* | 6/2017 | Oh | H04N 21/235 |

OTHER PUBLICATIONS

Anonymous: "Text of ISO/IEC IS 23009-1 Media Presentation Description and Segment Formats", 98. MPEG Meeting; Nov. 28, 2011-Feb. 12, 2012; Geneva; (Motion Picture Expert Group or ISO/IEC JTC1/SC29/WG11),, No. N12329, Jan. 6, 2012 (Jan. 6, 2012), XP030018824, 130 pp.

Ebu: "Digital Audio Compression (AC-4) Standard", ETSI TS 103 190 V1.1.1 (Apr. 2014), DTS/JTC-025, ETSI, 650, Route des Lucioles, F-06921, Sophia Antipolis Cedex, France, Apr. 1, 2014, XP055228097, pp. 1-295. Retrieved from the Internet: URL: http://www.etsi.org/deliver/etsi_ts/103100_103199/103190/01.01.01_60/ts_103190v010101p.pdf.

"Exploration of Multi-stream DASH Delivery of Audio, Including MPEG-H 3D Audio," 113, MPEG Meeting; Oct. 19, 2015-Oct. 23, 2015; Geneva; (Motion Picture Expert Group or ISO/IEC JTC1/SC29/WG11),, No. N15687, Oct. 23, 2015 (Oct. 23, 2015), XP030022375.

International Search Report and Written Opinion—PCT/US2016/064391—ISA/EPO—dated Feb. 16, 2017—16 pp.

Herre et al., "MPEG-H 3D Audio—The New Standard for Coding of Immersive Spatial Audio," IEEE Journal of Selected Topics in Signal Processing, vol. 9, No. 5, Aug. 2015, 10 pp.

"Information technology—Dynamic adaptive streaming over HTTP (DASH)—Part 1: Media presentation description and segment formats," International Standard ISO/IEC 23009-1, Apr. 1, 2012, 132 pp.

3rd Generation Partnership Project, "Techinical Specification Group services and System Aspects; Transparent end-to-end Packet-switched Streaming Service (PSS); Prgoressive Download and Synamic Adaptive Streaming over HTTP (3GP-DASH)," 3GPP TS 26.247, Release 12, v.12.1.0, Dec. 2013, 118 pp.

International Organisation for Standardisation, "Text of ISO/IEC 13818-1:2013/PDAM 7 Carriage of Layered HEVC," ISO/IEC JTC1/SC29/WG11 MPEG108/w14319, Apr. 2014, 28 pp.

International Organisation for Standardisation, "Text of ISO/IEC 13818-1:2015/FDAM 2 Carriage of Layered HEVC," ISO/IEC JTC1/SC291WG11 MPEG112/N15468, Jun. 2015, 24 pp.

International Standard Organization, "Information technology—Coding of audio-visual objects—Part 12: ISO base media file format," International Standard ISO/IEC 14496-12:2012, Technical Corrigendum 4, Jul. 1, 2015, 2 pp.

European Telecommunications Standards Institute, "Digital Video Broadcasting (DVB); MPEG-DASH Profile for Transport of ISO BMFF Based DVB Services over IP Based Networks," ETSI TS 103 285, v1.1.1, May 2015, 72 pp.

Response to Written Opinion dated Feb. 16, 2017, from International Application No. PCT/US2016/064391, filed on Jun. 23, 2017, 4 pp.

Second Written Opinion from International Application No. PCT/US2016/064391, dated Oct. 9, 2017, 7 pp.

* cited by examiner

SELECTION OF CODED NEXT GENERATION AUDIO DATA FOR TRANSPORT

This application claims the benefit of U.S. Provisional Application Nos. 62/261,743, filed Dec. 1, 2015, and 62/387,269, filed Dec. 22, 2015, the entire contents of each of which are hereby incorporated by reference.

TECHNICAL FIELD

This disclosure relates to transport of media data, and in particular, transport of audio data.

BACKGROUND

A higher-order ambisonics (HOA) signal (often represented by a plurality of spherical harmonic coefficients (SHC) or other hierarchical elements) is a three-dimensional representation of a soundfield. The HOA or SHC representation may represent the soundfield in a manner that is independent of the local speaker geometry used to playback a multi-channel audio signal rendered from the SHC signal. The HOA or SHC representation may be encoded. Correspondingly video data may also be encoded, as well as other media data, such as timed text.

After media data, such as audio or video data, has been encoded, the media data may be packetized for transmission or storage. The media data may be assembled into a media file conforming to any of a variety of standards, such as the International Organization for Standardization (ISO) base media file format and extensions thereof.

SUMMARY

In general, this disclosure describes techniques for transporting next generation audio (NGA) data using streaming delivery, such as broadcast or broadband-based unicast. Techniques for selection (e.g., pre-selection) of audio objects based on characteristics of the audio objects are also described.

In one example, a method of receiving media data includes receiving a manifest file describing a plurality of audio objects conforming to MPEG-H or AC-4 part 2, wherein the manifest file indicates whether each of the audio objects is available via broadcast, broadband, or both broadcast and broadband, receiving selection data indicating which of the audio objects are to be presented, receiving streamed media data including the audio objects based on the selection data, and providing the audio objects indicated by the selection data to an audio decoder.

In another example, a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

In another example, a device for receiving audio data includes an audio decoder implemented using digital logic circuitry and configured to decode audio data conforming to MPEG-H or AC-4 part 2, means for receiving a manifest file describing a plurality of audio objects conforming to MPEG-H or AC-4 part 2, wherein the manifest file indicates whether each of the audio objects is available via broadcast, broadband, or both broadcast and broadband, means for receiving selection data indicating which of the audio objects are to be presented, means for receiving streamed media data including the audio objects based on the selection data, and means for providing the audio objects indicated by the selection data to the audio decoder.

In another example, a computer-readable storage medium has stored thereon instructions that, when executed, cause one or more processors of a receiver device to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to an audio decoder of the receiver device. The details of one or more examples are set forth in the accompanying drawings and the description below. Other features, objects, and advantages will be apparent from the description and drawings, and from the claims.

DETAILED DESCRIPTION

Figure 1:
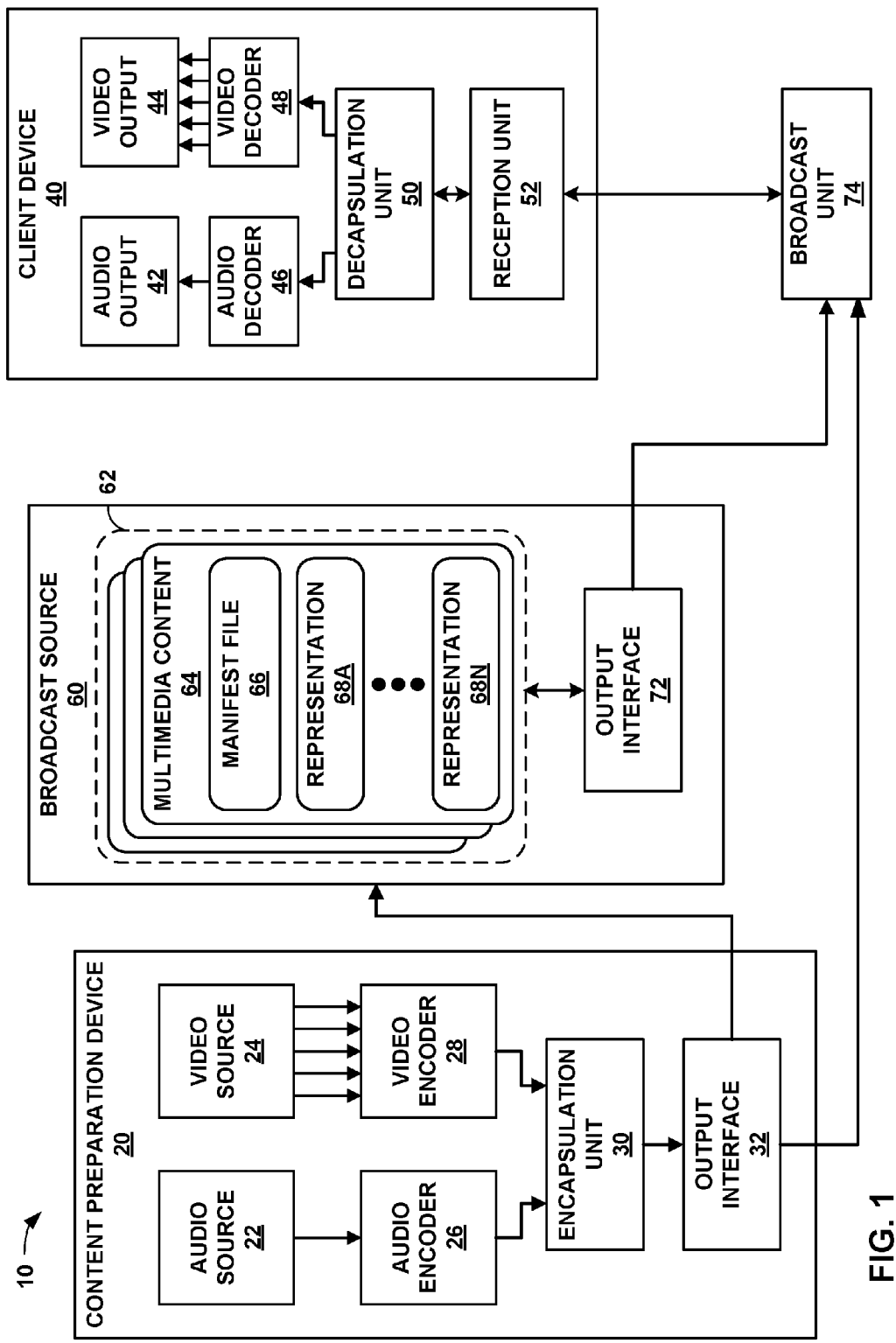
FIG. 1 is a block diagram illustrating an example system that implements techniques for streaming media data over a network.

In general, this disclosure describes techniques for transporting encoded media data, such as encoded audio data. The techniques of this disclosure are generally directed to advertising available audio data streams in a set of metadata accompanying one of the streams, such as a music and effects (M&E) stream. That is, a variety of different audio data streams may be available, e.g., the M&E stream, dialogue streams of various languages, and commentary of various languages. The metadata may describe which sets of audio data streams are available and characteristics of the streams. The metadata may further indicate how the streams can be accessed, e.g., whether the streams are available via a broadcast (such as an ATSC 3.0 broadcast or a network-based broadcast or multicast, such as enhanced Multimedia Broadcast Multicast Service (eMBMS)), broadband (e.g., unicast network retrieval), or both.

The metadata may be included in a manifest file, such as a media presentation description (MPD) of Dynamic Adaptive Streaming over HTTP (DASH) or included in other types of manifest files associated with other HTTP streaming protocols. Moreover, a receiving device may include an audio processing unit configured to receive the metadata. The metadata may conform to a next generation audio (NGA) coding standard, such as MPEG-H or AC-4 Part 2. Thus, rather than configuring an MPEG-2 Systems layer unit or other such processing unit to analyze the metadata, certain aspects of the techniques of this disclosure include using an NGA audio decoding unit that is already configured to process the metadata of an NGA coding standard to provide information from the metadata to the MPEG-2 Systems layer unit. In this manner, the techniques of this disclosure can leverage the capabilities of the NGA audio decoding unit as part of a data transmission and reception process, in addition to part of a decoding and rendering process.

Furthermore, in accordance with certain techniques of this disclosure, and in accordance with the DASH streaming protocol, each audio stream may correspond to a DASH Adaptation Set. That is, the manifest file discussed above may signal characteristics for Adaptation Sets, where each of the Adaptation Sets may correspond to one of the available audio data streams.

Moreover, in some examples, a user may select certain options for audio data that can be stored as configuration data for pre-selection of the available audio streams. For example, a user may elect to receive a music and effects stream and a dialogue stream of a certain language (e.g., English), without commentary, as a default. Thus, a receiving device may include a user agent unit that stores pre-selection data to be used to select from available audio streams. Accordingly, the NGA audio decoding unit may determine which audio data streams are available and advertise the available audio data streams to an MPEG-2 Systems layer unit. The MPEG-2 Systems layer unit may receive pre-selection data from, e.g., a user agent unit representing which streams are to be selected, and provide selection data to the NGA audio decoding unit.

The evolution of surround sound has made available many output formats for entertainment. Examples of such consumer surround sound formats are mostly 'channel'-based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that include height speakers such as the 7.1.4 format and the 22.2 format (e.g., for use with the Ultra High Definition Television standard). Non-consumer formats can span any number of speakers (in symmetric and non-symmetric geometries) often termed 'surround arrays'. One example of such an array includes 32 loudspeakers positioned on coordinates on the corners of a truncated icosahedron.

The input to a future MPEG-H encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); and (iii) scene-based audio, which involves representing the soundfield using coefficients of spherical harmonic basis functions (also called "spherical harmonic coefficients" or SHC, "Higher-order Ambisonics" or HOA, and "HOA coefficients"). An MPEG-H encoder is described in more detail in MPEG-H 3D Audio—The New Standard forCoding of Immersive Spatial Audio, Jurgen Herre, Senior Member, IEEE, Johannes Hilpert, Achim Kuntz, and Jan Plogsties, IEEE JOURNAL OF SELECTED TOPICS IN SIGNAL PROCESSING, VOL. 9, NO. 5, AUGUST 2015 (also referred to herein as "the IEEE Paper").

The new MPEG-H 3D Audio provides for standardized audio bitstreams for each of the channel, object and scene-based audio streams, and a subsequent decoding that is adaptable and agnostic to the speaker geometry (and number of speakers) and acoustic conditions at the location of the playback (involving a renderer).

As pointed out in the IEEE Paper, HOA provides more coefficient signals and thus an increased spatial selectivity, which allows loudspeaker signals to be rendered with less crosstalk, resulting in reduced timbral artifacts. In contrast to objects, spatial information in HOA is not conveyed in explicit geometric metadata, but in the coefficient signals themselves. Thus, Ambisonics/HOA is not that well suited to allow access to individual objects in a sound scene. However, there is more flexibility for content creators, using a hierarchical set of elements to represent a soundfield. The hierarchical set of elements may refer to a set of elements in which the elements are ordered such that a basic set of lower-ordered elements provides a full representation of the modeled soundfield. As the set is extended to include higher-order elements, the representation becomes more detailed, increasing resolution.

One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $k=\omega/c$, c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\Omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The techniques of this disclosure may be used to transport audio data that was encoded as discussed above using a streaming protocol, such as Dynamic Adaptive Streaming over HTTP (DASH). Various aspects of DASH are described in, e.g., "Information Technology—Dynamic Adaptive Streaming over HTTP (DASH)—Part 1: Media Presentation Description and Segment Formats," ISO/IEC 23009-1, Apr. 1, 2012; and 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 12) 3GPP TS 26.247, V12.1.0, December 2013.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming audio data using HTTP streaming, there may be multiple representations for video and/or audio data of multimedia content.

As explained below, different representations may correspond to different forms of scalable coding for HOA, e.g., scene-based audio.

The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availabilityStartTime attribute for each period. For live services, the sum of the start attribute of the period and the MPD attribute availabilityStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. As another example, representations of an audio adaptation set may include the same type of audio data, encoded at different bitrates to support bandwidth adaptation. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select a video adaptation set including video representations, an adaptation set including audio representations, and/or an adaptation set including timed text.

The techniques of this disclosure may be used to multiplex media (e.g., 3D audio) data into, e.g., MPEG-2 Systems, described in "Information technology—Generic coding of moving pictures and associated audio information—Part 1: Systems," ISO/IEC 13818-1:2013 (also ISO/IEC 13818-1:2015) (also referred to as "MPEG-2 Systems" or "Systems"). The Systems specification describes streams/tracks with access units, each with a time stamp. Access units are multiplexed and there is typically some flexibility on how this multiplexing can be performed. MPEG-H audio permits samples of all objects to be placed in one stream, e.g., all samples with the same time code may be mapped into one access unit. At the system level, it is possible to generate one master stream and multiple supplementary streams that allow separation of the objects into different system streams. System streams create flexibility: they allow for different delivery path, for hybrid delivery, for not delivering one at all, and the like.

Files that include media data, e.g., audio and/or video data, may be formed according to the ISO Base Media File Format (BMFF), described in, e.g., "Information technology—Coding of audio-visual objects—Part 12: ISO base media file format," ISO/IEC 14496-12:2012. In ISO BMFF, streams are tracks—the access units are contained in a movie data (mdat) box. Each track gets a sample entry in the movie header and sample table describing the samples can physically be found. Distributed storage is also possible by using movie fragments.

In MPEG-2 Transport Stream (TS), streams are elementary streams. There is less flexibility in MPEG-2 TS, but in general the techniques are similar to ISO BMFF. In MPEG-2 TS, each elementary stream may correspond to a program having a program identifier (PID).

Although files containing media data (e.g., encoded 3D audio data) may be formed according to any of the various techniques discussed above, this disclosure describes techniques with respect to ISO BMFF/file format.

In general, files may contain encoded media data, such as encoded 3D audio data. In DASH, such files may be referred to as "segments" of a representation, as discussed above. Furthermore, a content provider may provide media content using various adaptation sets, as noted above. With respect to 3D audio data, the scene audio data may be offered in one adaptation set. This adaptation set may include a variety of switchable (that is, alternative) representations for the scene audio data (e.g., differing from each other in bitrate, but otherwise being substantially the same). Similarly, audio objects may each be offered in a respective adaptation set. Alternatively, an adaptation set may include multiple audio objects, and/or one or more audio objects may be offered in multiple adaptation sets.

In accordance with certain techniques of this disclosure, a device may include a single audio decoder for decoding audio data from a plurality of different audio streams. For example, the audio streams may include a music and effects (M&E) stream, one or more dialogue streams, and one or more commentary streams. The one or more dialogue and commentary streams may be available in different languages (e.g., English, French, German, Spanish, etc.) Thus, a selection may be made based on user preferences for languages. As explained in greater detail below, each of the audio streams may correspond to a respective partial adaptation set (also referred to as a "partial AS"). Partial adaptation sets may generally include data that cannot be decoded from the partial adaptation set alone; instead, to be decodable, a client device may obtain data for a combination of partial adaptation sets, e.g., one M&E stream, one dialogue stream, and one commentary stream. The combination of partial adaptation sets may be decodable. For example, initialization data may be carried in the M&E stream, but not in the dialogue and/or commentary streams. This disclosure provides various techniques for signaling data related to selections of combinations of audio streams, as well as techniques by which a client device may use the data to select combinations of audio streams.

In general, a fully presentable audio presentation may correspond to one or more full or partial adaptation sets that can be presented to a user. For example, a fully presentable audio presentation may correspond to a music and effects adaptation set, and/or a dialogue adaptation set of a particular language. A fully presentable audio presentation may include all data needed to decode and render the audio data thereof. In some instances, an adaptation set may depend on one or more other adaptation sets. For example, an adaptation set may depend on another adaptation set if data or metadata from the other adaptation set is needed to access, decode, or render the adaptation set. In some examples, a single adaptation set may represent a fully presentable audio presentation, and may further be assigned a specific identifier. An adaptation set that is not a fully presentable audio presentation may include a reference to the specific identifier(s) of the adaptation sets on which the adaptation set depends.

In accordance with certain techniques of this disclosure, devices that send and receive media data, e.g., via DASH, may use one or more codec-independent models for next generation audio (NGA) codecs integrated with DASH and/or Advanced Television Systems Committee (ATSC) (and/or other system standards). Examples of such models are described in greater detail below.

FIG. 1 is a block diagram illustrating an example system 10 that implements techniques for streaming media data via an over-the-air (OTA) broadcast. In this example, system 10 includes content preparation device 20, broadcast source device 60, broadcast unit 74, and client device 40. Broadcast source device 60 may comprise, for example, a television network office, a cable television office, or the like. Broadcast unit 74 may comprise, for example, a satellite, a cable television distribution hub, an antenna, or the like. Although only a single broadcast unit 74 is shown in the example of FIG. 1, it should be understood that multiple intermediate devices may be positioned between broadcast source device 60 and client device 40. In some examples, content preparation device 20 and broadcast source device 60 may be coupled by a computer-based network or may be directly communicatively coupled. Alternatively, content preparation device 20 may supply multimedia content to broadcast source device 60 via delivery of a computer-readable storage medium, such as a hard disk, a flash drive, a CD, a DVD, a Blu-ray disc, or the like. In some examples, content preparation device 20 and broadcast source device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to broadcast source device 60 in all examples, but may store multimedia content to a separate medium that is read by broadcast source device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time (or are otherwise to be presented at the same time) and for which an audio frame and a video frame comprise, respectively, the audio data and the video data that was captured at the same time. In addition, audio data may be generated separately that is to be presented contemporaneously with the video and other audio data, e.g., narration.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. Similarly, audio encoder 26 may encode audio data in a variety of different ways with various characteristics. As discussed in greater detail below, for example, audio encoder 26 may form audio adaptation sets that each include one or more of scene-based audio data, channel-based audio data, and/or object-based audio data. In addition or in the alternative, audio encoder 26 may form adaptation sets that include scalable audio data. For example, audio encoder 26 may form adaptation sets for a base layer, left/right information, and height information, as discussed in greater detail below.

A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets.

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to broadcast source device 60 via network transmission or storage media. In the example of FIG. 1, broadcast source device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Broadcast source device 60 includes output interface 72. Broadcast source device 60 provides multimedia content to broadcast unit 74 via output interface 72.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, reception unit 52 may include both an OTA broadcast middleware unit and a media player client. The OTA broadcast middleware unit may act as a proxy server for the media player client, which may be configured to retrieve media data via network protocols, e.g., in accordance with Dynamic Adaptive Streaming over HTTP (DASH). That is, the media client may comprise a DASH client. Thus, the media client may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. The media client may be configured to submit HTTP GET and partial GET requests to the OTA broadcast middleware unit. Certain aspects of reception unit 52 may be implemented as software instructions executed by one or more processors or processing units (not shown) of client device 40. That is, portions of the functionality described with respect to reception unit 52 may be implemented in hardware, or a combination of hardware, software, and/or firmware, where requisite hardware may be provided to execute instructions for software or firmware.

The media player client of reception unit 52 may compare the decoding and rendering capabilities of client device 40 to characteristics of representations 68 indicated by information of manifest file 66. The media player client may initially retrieve at least a portion of manifest file 66 to determine characteristics of representations 68. For example, the media player client may request a portion of manifest file 66 that describes characteristics of one or more adaptation sets. The media player client may select a subset of representations 68 (e.g., an adaptation set) having characteristics that can be satisfied by the coding and rendering capabilities of client device 40. The media player client may then determine bitrates for representations in the adaptation set, determine a currently available amount of network bandwidth, and retrieve segments from one of the representations having a bitrate that can be satisfied by the network bandwidth.

As noted above, reception unit 52 may include an OTA broadcast middleware unit. The OTA broadcast middleware unit may be configured to receive OTA broadcast signals, e.g., in accordance with ATSC. Furthermore, the OTA broadcast middleware unit may implement a network proxy server that caches received media data locally and responds to network requests for data from a media player client of reception unit 52.

Although this example includes OTA broadcasts in accordance with, e.g., ATSC, in other examples, media data may be transported via network broadcasts, such as Enhanced Multimedia Broadcast Multicast Service (eMBMS). In such examples, media data may be broadcast or multicast by a network server (which may generally correspond to broadcast source device 60) to client device 40 via a computer-based network (not shown in this example). The network may be positioned between the server device and client device 40, and may include various network devices, such as routers, switches, hubs, gateways, and the like. Furthermore, reception unit 52 may include an eMBMS middleware unit, in place of an OTA broadcast middleware unit. The eMBMS middleware unit may operate substantially the same as the OTA broadcast middleware unit described in this example, except for the inclusion of an eMBMS reception unit in place of the OTA broadcast reception unit as described herein.

Reception unit 52 provides received segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, reception unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, reception unit 52, and/or decapsulation unit 50 may comprise an integrated circuit, a microprocessor, and/or a wireless communication device, such as a cellular telephone.

Client device 40, broadcast source device 60, and/or content preparation device 20 may be configured to operate in accordance with the techniques of this disclosure. For purposes of example, this disclosure describes these techniques with respect to client device 40 and broadcast source device 60. However, it should be understood that content preparation device 20 may be configured to perform these techniques, instead of (or in addition to) broadcast source device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Reception unit 52 extracts NAL units or access units from broadcast signals received from broadcast unit 74 and provides the NAL units or access units to reception unit 52, which may deliver the NAL units to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Although not shown explicitly in the example of FIG. 1, client device 40 may further include a media application. The media application may perform all or a portion of the functionality of any of audio decoder 46, video decoder 48, decapsulation unit 50, and/or reception unit 52. For example, the media application may form part of reception unit 52, or be separate from reception unit 52. In addition to the functionality described above, the media application may cause client device 40 to present a user interface, such as a graphical user interface (GUI) to a user to allow for selection of multimedia data, such as a movie or other program content. The media application may provide an indication of the selected content to reception unit 52 to cause reception unit 52 to receive media data of the selected program content, as discussed above. The media application may be stand-alone software.

Figure 2:
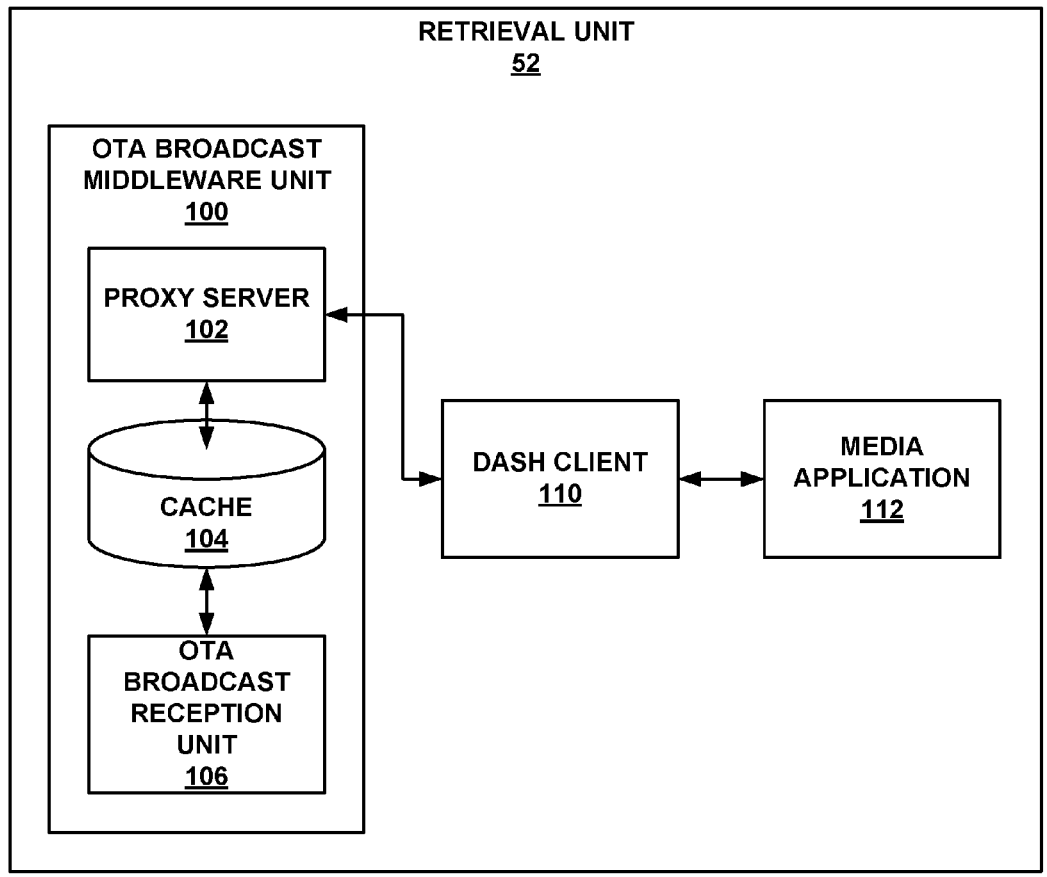
FIG. 2 is a block diagram illustrating an example set of components of a retrieval unit in greater detail.

FIG. 2 is a block diagram illustrating an example set of components of reception unit 52 of FIG. 1 in greater detail. In this example, reception unit 52 includes OTA broadcast middleware unit 100, DASH client 110, and media application 112.

OTA broadcast middleware unit 100 further includes OTA broadcast reception unit 106, cache 104, and proxy server 102. In this example, OTA broadcast reception unit 106 is configured to receive data via an OTA broadcast, e.g., via an Advanced Television Systems Committee (ATSC) broadcast. That is, OTA broadcast reception unit 106 may receive files via broadcast from, e.g., broadcast source device 60.

As OTA broadcast middleware unit 100 receives data for files, OTA broadcast middleware unit 100 may store the received data in cache 104. Cache 104 may comprise a computer-readable storage medium, such as flash memory, a hard disk, RAM, or any other suitable storage medium.

Proxy server 102 may act as a proxy server for DASH client 110. For example, proxy server 102 may provide a MPD file or other manifest file to DASH client 110. Proxy server 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server 102. Proxy server 102 may retrieve requested data from cache 104 and provide the data to DASH client 110 in response to such requests.

After receiving a segment, DASH client 110 may pass data of the segment to media application 112. DASH client 110 may process the segment, e.g., to extract media data from the segment and/or to discard data that is unusable by media application 112. In some examples, DASH client 110 may be implemented as an extension to a web browser, and media application 112 may be implemented as a video and/or music playing application.

Figure 3:
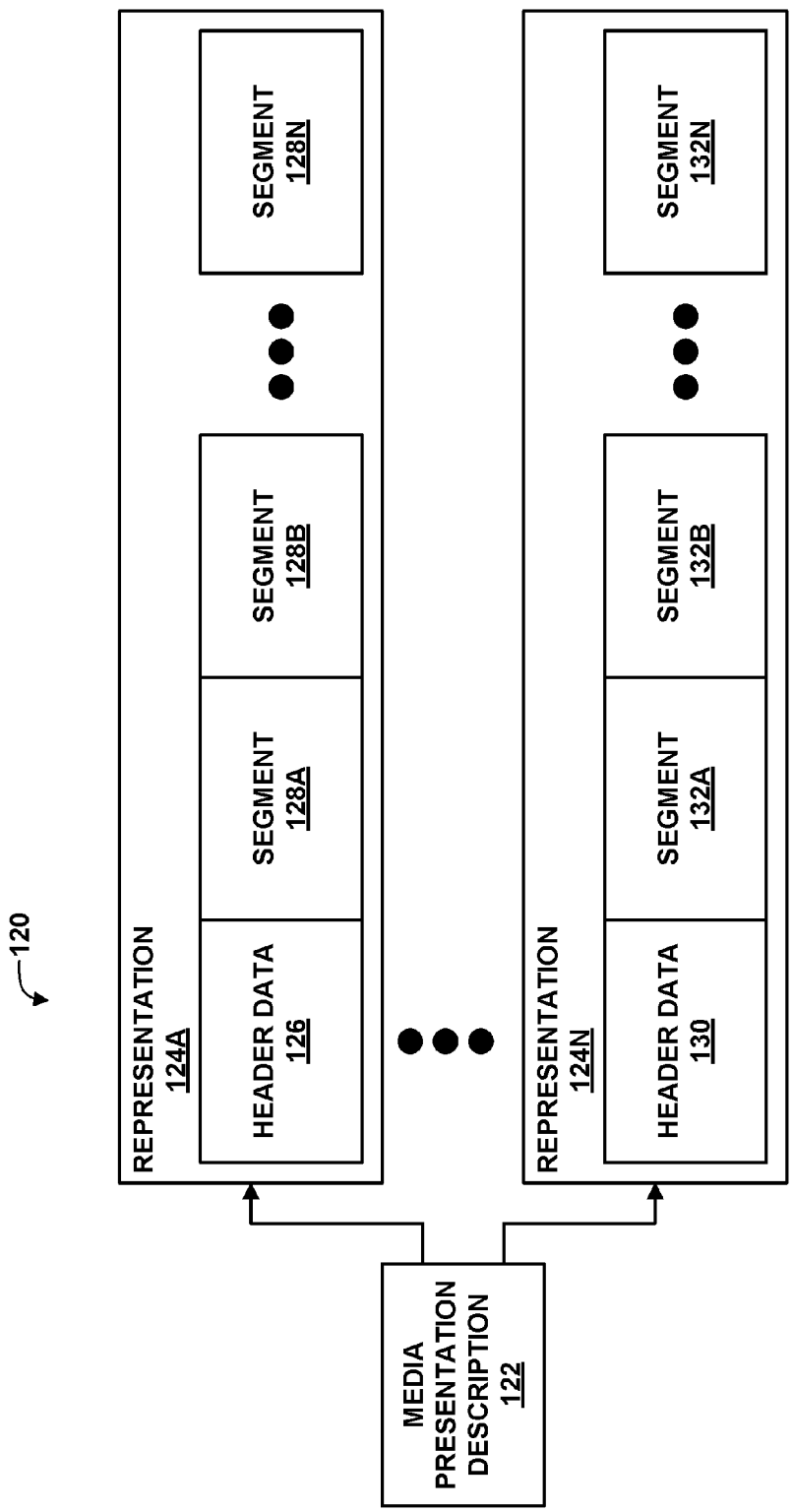
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded media samples. Each of the coded media samples of segments 128 may have similar characteristics, e.g., language (if speech is included), location, CODEC, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
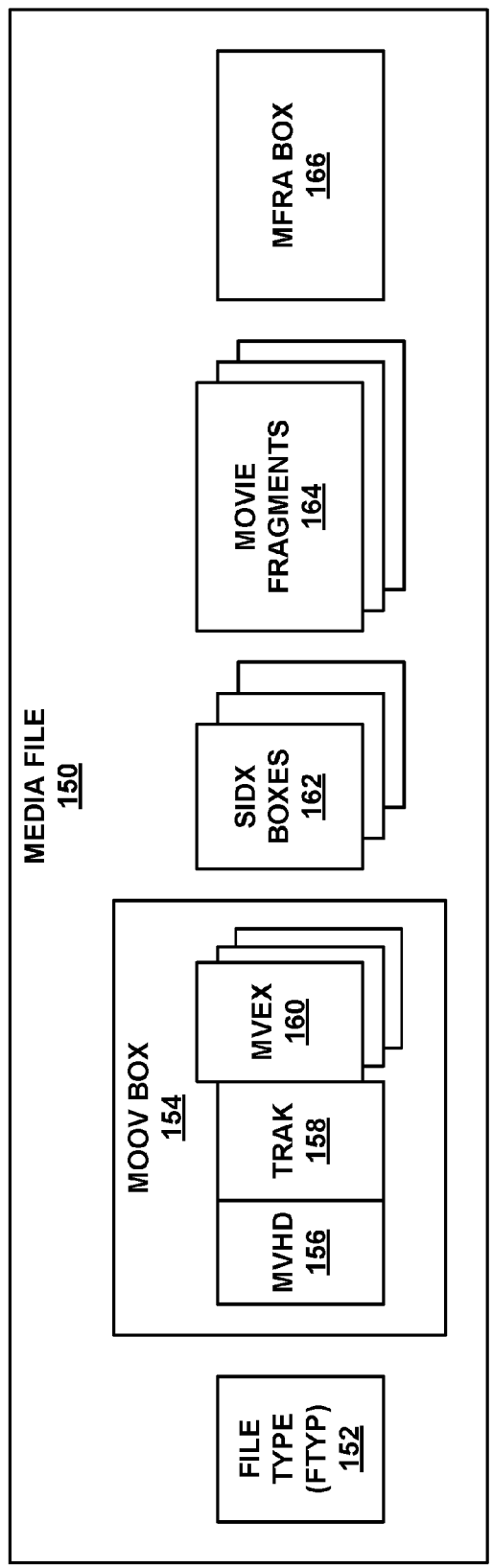
FIG. 4 is a block diagram illustrating elements of an example media file, which may correspond to a segment of a representation.

FIG. 4 is a block diagram illustrating elements of an example media file 150, which may correspond to a segment of a representation, such as one of segments 128, 132 of FIG. 3. Each of segments 128, 132 may include data that conforms substantially to the arrangement of data illustrated in the example of FIG. 4. Media file 150 may be said to encapsulate a segment. As described above, video files in accordance with the ISO base media file format and extensions thereof store data in a series of objects, referred to as "boxes." In the example of FIG. 4, media file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of media file 150, in accordance with the ISO base media file format and its extensions.

File type (FTYP) box 152 generally describes a file type for media file 150. File type box 152 may include data that identifies a specification that describes a best use for media file 150. File type box 152 may alternatively be placed before MOOV box 154, movie fragment boxes 164, and/or MFRA box 166.

MOOV box 154, in the example of FIG. 4, includes movie header (MVHD) box 156, track (TRAK) box 158, and one or more movie extends (MVEX) boxes 160. In general, MVHD box 156 may describe general characteristics of media file 150. For example, MVHD box 156 may include data that describes when media file 150 was originally created, when media file 150 was last modified, a timescale for media file 150, a duration of playback for media file 150, or other data that generally describes media file 150.

TRAK box 158 may include data for a track of media file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162. In some examples, a track ID of a track may represent an identifier for a fully presentable audio presentation of media file 150. That is, the corresponding track may include the audio data for the fully presentable audio presentation. Alternatively, a program identifier (PID) may identify a program corresponding to an elementary stream in an MPEG-2 TS including a fully presentable audio presentation.

In some examples, media file 150 may include more than one track. Accordingly, MOOV box 154 may include a number of TRAK boxes equal to the number of tracks in media file 150. TRAK box 158 may describe characteristics of a corresponding track of media file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as media file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that media file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in media file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of media file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within media file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in media file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in media file 150.

MFRA box 166 may describe random access points within movie fragments 164 of media file 150. This may assist with performing trick modes, such as performing seeks to particular temporal locations (i.e., playback times) within a segment encapsulated by media file 150. MFRA box 166 is generally optional and need not be included in video files, in some examples. Likewise, a client device, such as client device 40, does not necessarily need to reference MFRA box 166 to correctly decode and display video data of media file 150. MFRA box 166 may include a number of track fragment random access (TFRA) boxes (not shown) equal to the number of tracks of media file 150, or in some examples, equal to the number of media tracks (e.g., non-hint tracks) of media file 150.

In some examples, movie fragments 164 may include one or more stream access points (SAPs), such as IDR pictures. Likewise, MFRA box 166 may provide indications of locations within media file 150 of the SAPs. Accordingly, a temporal sub-sequence of media file 150 may be formed from SAPs of media file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
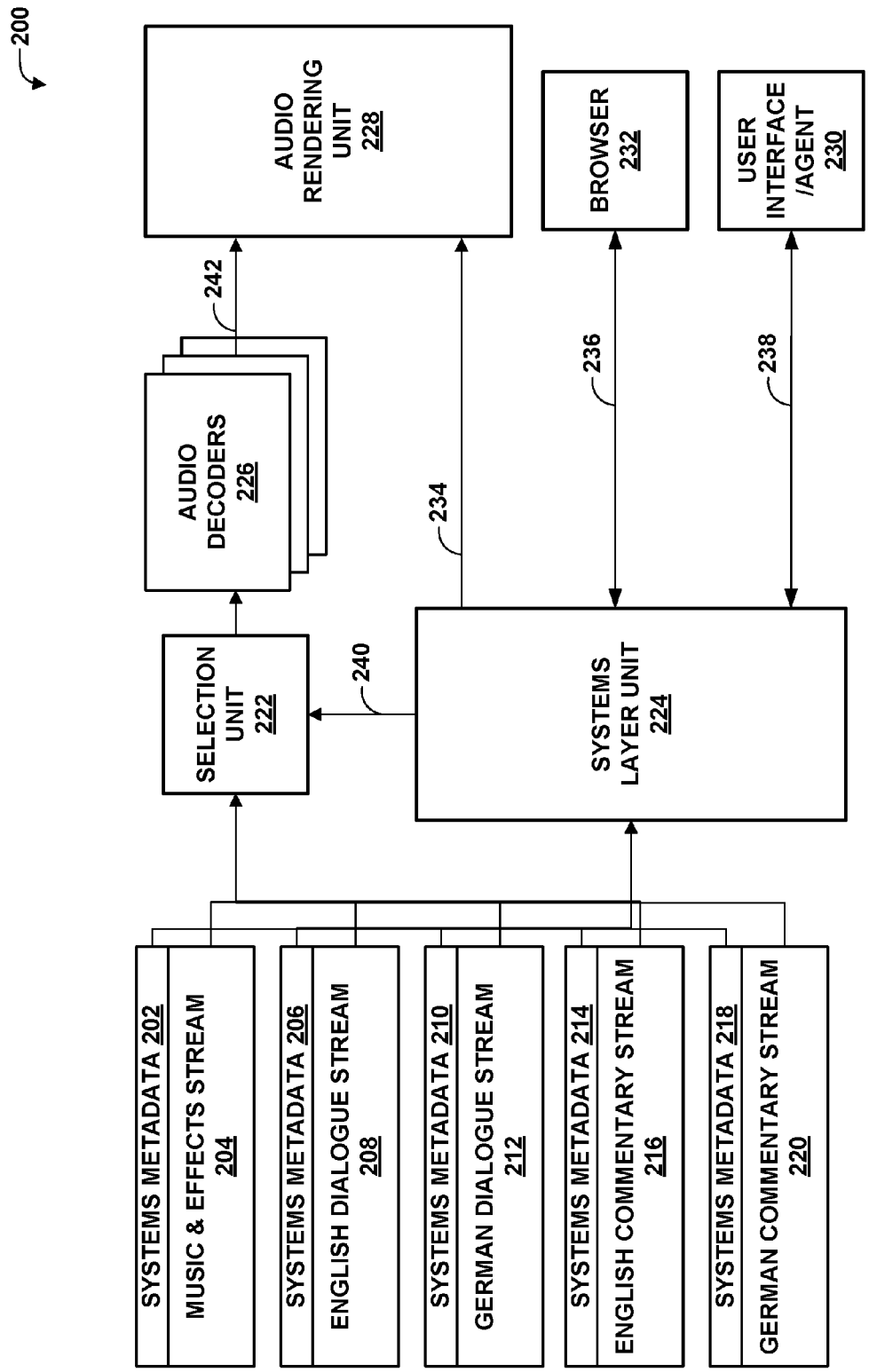
FIG. 5 is a conceptual diagram illustrating an example legacy system for transporting audio data.

FIG. 5 is a conceptual diagram illustrating an example system 200 for receiving audio data. System 200 includes selection unit 222, Systems layer unit 224, audio decoders 226, audio rendering unit 228, browser 232, and user interface/agent 230. In this example, the received audio data may include any or all of music & effects (M&E) stream 204 (with accompanying Systems metadata 202), English dialogue stream 208 (with accompanying Systems metadata 206), German dialogue stream 212 (with accompanying Systems metadata 210), English commentary stream 216 (with accompanying Systems metadata 214), and German commentary stream 220 (with accompanying Systems metadata 218).

In general, Systems layer unit 224 may implement techniques of MPEG-2 Systems, e.g., for receiving transported media data, such as audio data. Thus, Systems layer unit 224 in this example receives Systems metadata 202, 206, 210, 214, and 218. Systems layer unit 224 may use the Systems metadata to access the audio data of the corresponding streams. Systems layer unit 224 may also determine network capabilities, such as whether broadcast and/or broadband are available, and prevent selection of streams carried only on unavailable networks. User interface/agent 230 may pass selection data 238 via an API provided by Systems layer unit 224 to select any or all of M&E stream 204, English dialogue stream 208, German dialogue stream 212, English commentary stream 216, and/or German commentary stream 220. Additionally or alternatively, browser 232 may provide selections 236 to Systems layer unit 224 via W3C sourcing in-band media resource tracks.

Systems layer unit 224 passes selection data 240 to selection unit 222. Selection unit 222 receives media data of any or all of M&E stream 204, English dialogue stream 208, German dialogue stream 212, English commentary stream 216, and/or German commentary stream 220. Selection unit 222 passes audio data from the selected streams to audio decoders 226. For example, if selection data 240 indicates that M&E stream 204 and English dialogue stream 208 are selected, selection unit 222 passes audio data from M&E stream 204 and English dialogue stream 208 to audio decoders 226.

Audio decoders 226 decode the audio data received from selection unit 222. Audio decoders 226 pass decoded audio data 242 to audio rendering unit 228. Audio rendering unit 228 mixes decoded audio data 242 together and provides rendered audio data to an audio output, such as one or more speakers (not shown).

Document European Telecommunications Standards Institute (ETSI), "Digital Video Broadcasting (DVB); MPEG-DASH Profile for Transport of ISO BMFFBased DVB Services over IP Based Networks," ETSI TS 103 285 V1.1.1 (May 2015) describes certain DVB Rules in Clause 6.1.2, including:

Every audio Adaptation Set shall include at least one Role element using the scheme "urn:mpeg:dash:role:2011" as defined in ISO/IEC 23009-1 [1].

The use of the @value attribute set to "main" for audio content indicates to the Player that the Adaptation Set is the preferred audio Adaptation Set by the Content Provider.

If there is only one "main" then this Adaptation Set is then the default audio adaptation set.

If there is more than one audio Adaptation Set in a DASH presentation then at least one of them shall be tagged with an @value set to "main". It is possible to have multiple Adaptation Sets with @value set to "main", however, they shall be distinguished by other attributes such as @lang or @codec. If multiple Adaptation Sets have an @value set to "main" then the Player will choose which one of these Adaptation Sets is the most appropriate to use and only if all of these are inappropriate, it may choose one with @value set to something other than "main".

If a programme has multiple audio Adaptation Sets with the same codec but with an original soundtrack translated into different languages, for example a film soundtrack originally in Spanish translated into English, then only the primary language shall have the @value set to "main" with all the other languages set to "dub".

Players should then evaluate the @lang attribute of the Adaptation Set in order to confirm the audio language matches the dubbing language wanted by the user.

If a programme has multiple audio Adaptation Sets with the same codec but with different original soundtracks in different languages, for example a sports game commentated by multiple commentators in multiple languages, then all language Adaptation Sets shall have the @value set to "main". Players should then evaluate the @lang attribute of the Adaptation Set in order to confirm the audio language which matches the language wanted by the user.

If the programme has multiple audio Adaptation Sets with multiple codecs, the same original sound and the same language, but a Content Provider does not want to favour a codec, then they can set multiple Adaptation Sets with @value to "main" to let the Player choose the Adaptation Set.

If more than one role needs to be set then multiple role elements shall be used. As shown in Table 4, the combined use of Role and Accessibility Descriptors shall identify Adaptation Sets containing audio description and clean audio streams.

For receiver mixed Audio Description the associated audio stream shall use the @dependencyId attribute to indicate the dependency to the related Adaptation Set's Representations and hence also indicate that the associated audio stream shall not be provided as a Representation on its own. Players should ignore audio streams with other Role and Accessibility descriptor attributes that they do not understand.

| Description | Role element | Accessibility element |
|---|---|---|
| Broadcast mix AD | @schemeIdUri = "urn:mpeg:dash:role:2011" @value = "alternate" | @schemeIdUri = "urn:tva:metadata:cs:AudioPurposeCS:2007" @value = "1" for the visually impaired |
| Receiver mix AD | @schemeIdUri = "urn:mpeg:dash:role:2011" @value = "commentary" | @schemIdUri = "urn:tva:metadata:cs:AudioPurposeCS:2007" @value = "1" for the visually impaired |
| Clean Audio | @schemIdUri = "urn:mpeg:dash:role:2011" @value = "alternate" | @schemeIdUri = "urn:tva:metadata:csAudioPurposeCS:2007" @value = "2" for the hard of hearing |

The following table includes data from MPEG-DASH ISO/IEC 23009-1:2014/Amendment 2:

| Role@value | Description |
|---|---|
| caption | captions (see note 3 below) |
| subtitle | subtitles (see note 3 below) |
| main | main media component(s) which is/are intended for presentation if no other information is provided |
| alternate | media content component(s) that is/are an alternative to (a) main media content component(s) of the same media component type (see note 2 below) |
| supplementary | media content component that is supplementary to a media content component of a different media component type (see Note 1 below) |
| commentary | media content component with commentary (e.g., director's commentary) (typically audio) |
| dub | media content component which is presented in a different language from the original (e.g., dubbed audio, translated captions) |
| description | Textual or audio media component containing a textual description (intended for audio synthesis) or an audio description describing a visual component |
| sign | Visual media component representing a sign-language interpretation of an audio component. |
| metadata | Media component containing information intended to be processed by application specific elements. |
| enhanced-audio-intelligibility | Audio component with improved intelligibility of the dialogue |

ISO/IEC 23009-1 Section 5.8.5.7 describes an audio receiver mixing technique. More particularly, this clause defines a scheme for use in EssentialProperty or SupplementaryProperty to indicate that two audio Adaptation Sets need to be mixed by the media engine prior to playback. In this example, the @schemeIdUri attribute identifying the scheme is urn:mpeg:dash:audio-receiver-mix:2014. According to this section, the @value attribute shall contain the value of the AdaptationSet@id from an Adaptation Set with content type audio attribute with which the current Adaptation Set needs to be mixed with in order to provide complete audio experience. An example of receiver mix is the case where a single audio Adaptation Set provides music and effects—i.e., a complete audio experience without dialogue, where one or more other Adaptation Sets provide dialogue in different languages. In this case, the dialogue Adaptation Sets will depend on a music and effects Adaptation Set. The mixing requirement is unidirectional. That is, the requirement of mixing Representation A with Representation B when A is selected does not imply mixing the two is required if B is selected.

Additional MPEG-DASH audio parameters are described below. The following parameters can be signaled on an Adaptation Set level: @codecs, Audio Channel Configuration, Codec Independent Code Points, Channel Positions, Codec Independent Code Points, Sampling Rate, and Rating. Also, the network capabilities (broadcast only, and/or broadband) can be used to select and reject certain streams.

For all cases, the streams may be signaled for selection/rejection on a system level based on capabilities and preferences.

An example of signaling in a media presentation description (MPD) as of today is shown below:
Adaptation Set: @id=1; @codecs=mp4a.40.29
  Role(urn:mpeg:dash:role:2011, value="supplementary")
  Rep1: @qualityRanking=2 @bandwidth=32
  Rep2: @qualityRanking=1 @bandwidth=64
Adaptation Set: @id=2; @lang=en; @codecs=mp4a.40.29
  Role(urn:mpeg:dash:role:2011, value="main")
  Rep1: @qualityRanking=2 @bandwidth=64
  Rep2: @qualityRanking=1 @bandwidth=128
Adaptation Set: @id=3; @lang=de; @codecs=mp4a.40.29
  Role(urn:mpeg:dash:role:2011, value="main")
  Role(urn:mpeg:dash:role:2011, value="dub")
  Rep1: @qualityRanking=2 @bandwidth=64
  Rep2: @qualityRanking=1 @bandwidth=128
Adaptation Set: @id=4; @lang=en; @codecs=mp4a.40.29
  Role(urn:mpeg:dash:role:2011, value="commentary")
  Rep1: @qualityRanking=2 @bandwidth=64
  Rep2: @qualityRanking=1 @bandwidth=128
Adaptation Set: @id=5; @lang=de; @codecs=mp4a.40.29
  Role(urn:mpeg:dash:role:2011, value="commentary")
  Rep1: @qualityRanking=2 @bandwidth=64
  Rep2: @qualityRanking=1 @bandwidth=128

Examples of data according to MPEG-2 Systems and HTML-5 are described below. Only variant 1 is defined below, although variant 2a may be used as well.

| Attribute | How to source its value |
|---|---|
| id | Content of the id attribute in the ContentComponent or AdaptationSet element. Empty string if the id attribute is not present on either element |
| kind | Given a Role scheme of "urn:mpeg:dash:role:2011," determine the kind attribute from the value of the Role descriptors in the ContentComponent and AdaptationSet elements.<br>"alternative": if the role is "alternate" but not also "main" or "commentary", or "dub"<br>"captions": if the role is "caption" and also "main"<br>"descriptions": if the role is "description" and also "supplementary"<br>"main": if the role is "main" but not also "caption", "subtitle", or "dub"<br>"main-desc": if the role is "main" and also "description"<br>"sign": not used<br>"subtitles": if the role is "subtitle" and also "main"<br>"translation": if the role is "dub" and also "main"<br>"commentary": if the role is "commentary" but not also "main"<br>"": otherwise |

| Attribute | How to source its value |
|---|---|
| label | The empty string. |
| language | Content of the lang attribute in the ContentComponent or AdaptationSet element |

In summary, on legacy systems, there may be significant amounts of signaling. Possible areas in which signaling may be reduced or reused for NGA codecs include reuse of the existing principles of enabling selection for certain capabilities on system level, mapping to platform capabilities, and mapping to simple user interfaces/user agents (browsers). The legacy system lacks tools for interactivity, and NGA audio may enable this interactivity within the audio codec level.

Figure 6:
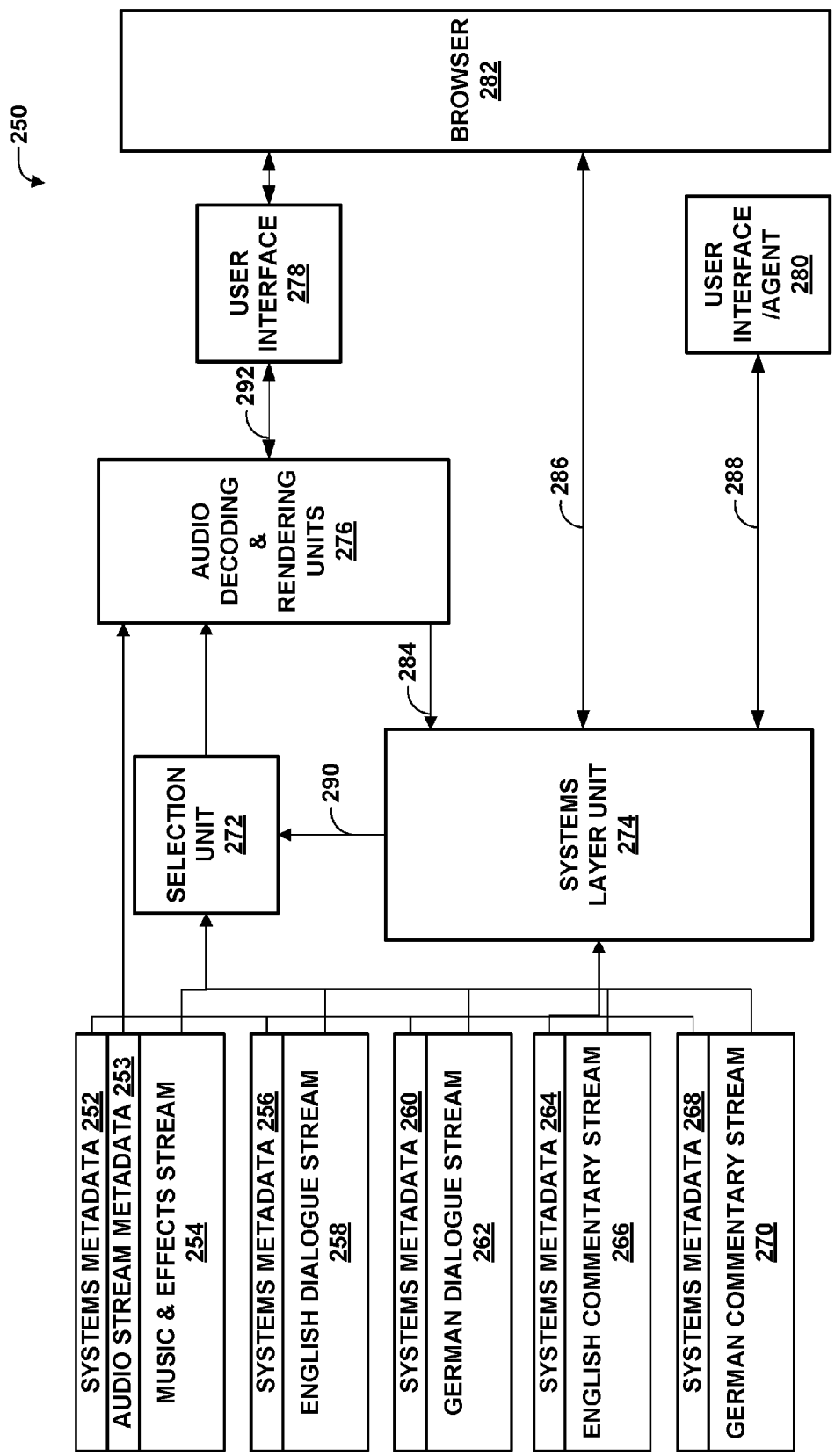
FIG. 6 is a conceptual diagram illustrating an example system that may be used to support many variants and options for transport of next generation audio data in accordance with the techniques of this disclosure.

FIG. 6 is a conceptual diagram illustrating an example system 250 that may be used to support many variants and options for reception of next generation audio data in accordance with certain techniques of this disclosure. In general, for next generation audio data, there is a single decoder to decode all audio objects (or all audio streams). Thus, system 250 includes selection unit 272, Systems layer unit 274, audio decoding & rendering units 276, user interface 278, user interface/agent 280, and browser 282.

In this example, music & effects (M&E) stream 254 represents an entry point audio stream. M&E stream 254 includes data that is used for all presentations (e.g., each of English dialogue stream 258, German dialogue stream 262, English commentary stream 266, and German commentary stream 270).

In the case of DASH, each of M&E stream 254, English dialogue stream 258, German dialogue stream 262, English commentary stream 266, and German commentary stream 270 may be mapped to respective Adaptation Sets. The DASH MPD may include Systems signaling data. Amd.2 and DVB DASH may include DASH-baseline signaling data. Systems layer unit 274 may determine network capabilities, taking into account the availability of certain networks. System 270 may be implemented in various deployments, such as broadcast and hybrid deployments.

Audio decoding & rendering units 276 may receive audio stream metadata 253. Audio stream metadata 253 may be included in, for example, a manifest file, such as a media presentation description (MPD) of DASH. Initially, audio decoding & rendering units 276 may process audio stream metadata 253 to determine which audio streams are available. Audio decoding & rendering units 276 may provide availability data 284 to Systems layer unit 274, where availability data 284 indicates which sets of audio data are available, based on audio stream metadata 253. In this example, the available audio data includes M&E stream 254 (accompanied by Systems metadata 252 and audio stream metadata 253), English dialogue stream 258 (accompanied by Systems metadata 256), German dialogue stream 262 (accompanied by Systems metadata 260), English commentary stream 266 (accompanied by Systems metadata 264), and German commentary stream 270 (accompanied by Systems metadata 268).

Systems layer unit 274 may receive Systems metadata 252, 256, 260, 264, and 268. Systems layer unit 274 may also provide availability data to browser 282 and/or user interface/agent 280, and receive selection data from the user (or user agent).

A user may interact with a device corresponding to system 250 via user interface 278, user interface/agent 280, and browser 282. In some examples, any or all user interface 278, user interface/agent 280, and browser 282 may be functionally integrated. In the example of FIG. 6, user interface/agent 280 may provide selection data 288 to Systems layer unit 274. Additionally or alternatively, browser 282 may provide selection data 286 to Systems layer unit 274 via W3C sourcing in-band media resource tracks. As still another example, browser 282 may present selection information to a user, and the user may provide a selection of audio content in response to the presentation via user interface 278, which may forward selection data 292 to audio decoding & rendering units 276 directly. In general, the selection data indicates which of the available streams are selected for retrieval and playback.

In some examples, Systems layer unit 274 provides selection data 290 to selection unit 272. Selection unit 272, in turn, provides audio data from the selected audio streams to audio decoding & rendering units 276. Audio decoding & rendering units 276 decode and render the selected audio data for playback on one or more audio output devices, e.g., one or more speakers (not shown).

In this manner, system 250 of FIG. 6 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Figure 7:
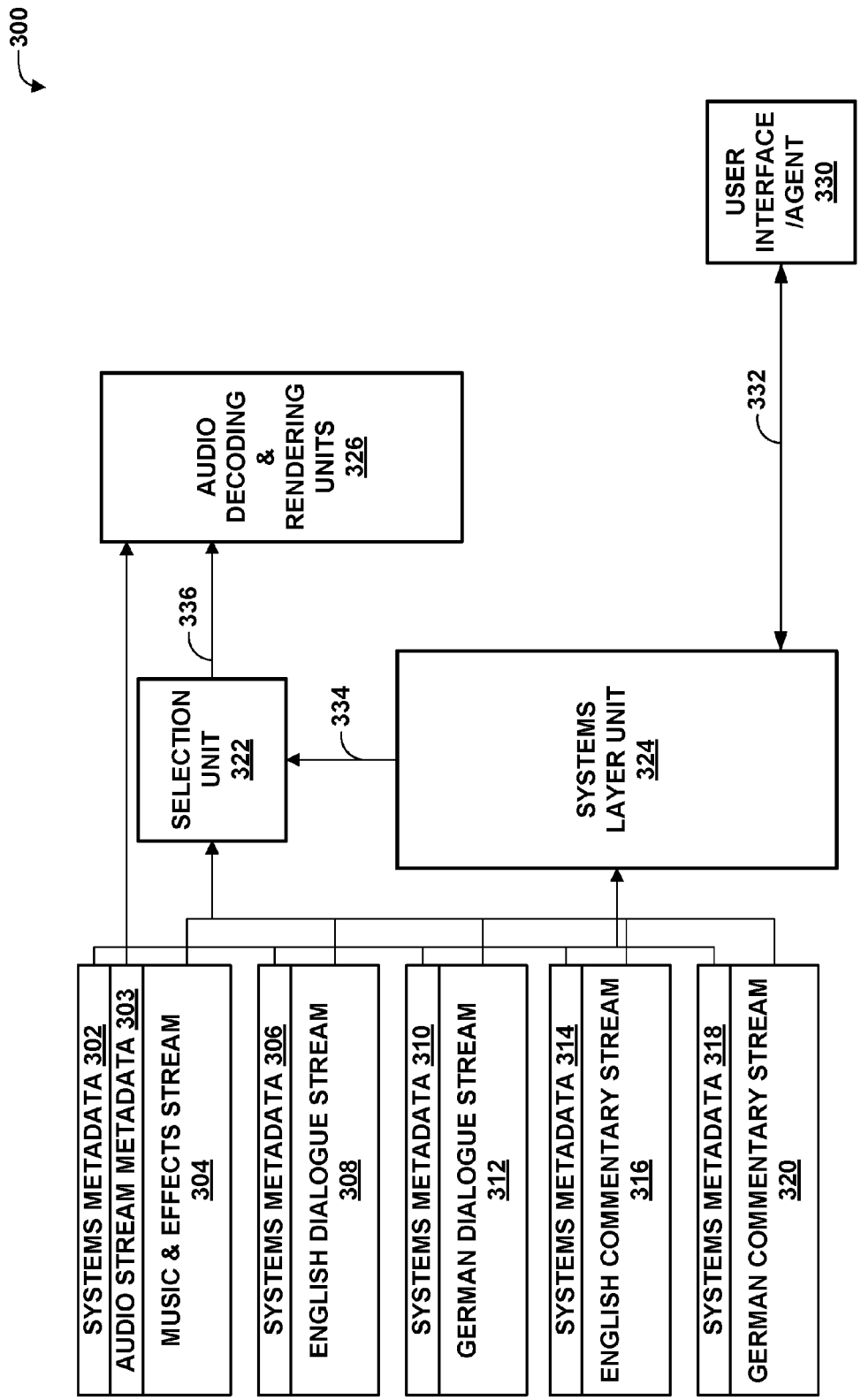
FIG. 7 is a conceptual diagram illustrating a first example that is Systems-centric.

FIG. 7 is a conceptual diagram illustrating an example system 300 that is Systems-centric. In this example, system 300 includes Systems layer unit 324, selection unit 322, audio decoding & rendering units 326, and user interface/agent 330. Systems layer unit 324, in this example, selects from available audio data based on audio stream metadata 303 that is provided with M&E stream 304, and based on input 332 from user interface/agent 330. Audio stream metadata 303 may be included in, for example, a manifest file, such as an MPD of DASH.

In this example, audio decoding & rendering units 326 receives audio stream metadata 303. Audio stream metadata 303, in this example, includes availability data indicating which sets of audio data are available. In this example, the available audio data includes M&E stream 304 (accompanied by Systems metadata 302 and audio stream metadata 303), English dialogue stream 308 (accompanied by Systems metadata 306), German dialogue stream 312 (accompanied by Systems metadata 310), English commentary stream 316 (accompanied by Systems metadata 314), and German commentary stream 320 (accompanied by Systems metadata 318).

In this example, Systems layer unit 324 has information representing decoding and rendering capabilities of audio decoding & rendering units 326, capabilities required to decode and render each of the available streams, network capabilities and delivery network for each of the available streams, and metadata for each available stream (i.e., Systems metadata 302, 306, 310, 314, 318). In accordance with this example, Systems layer unit 324 prunes available streams based on network capabilities, prunes available streams based on platform decoding and rendering capabilities, and provides information representing the remaining available streams to user interface/agent 330 of agent for selection. Systems layer unit 324 may select from available streams based on language of the streams, role/accessibility of the streams, and ratings (e.g., content appropriateness for various age groups).

In this example, Systems layer unit 324 provides selection data 334 to selection unit 322. Selection unit 322 receives audio data of the selected streams and forwards audio data 336 to audio decoding & rendering units 326 for decoding and rendering. Alternatively, Systems layer unit 324 may provide the selection data to audio decoding & rendering units 326 directly.

In an alternative example, each media stream may be self-described, e.g., based on language, rating, and role/accessibility. Systems layer unit 324 may provide the description of each stream to user interface/agent 330 for selection of the streams. Systems layer unit 324 may select streams and forward data of the selected streams to audio decoding & rendering units 326.

In this example, system 300 may perform a DASH gap analysis. The DASH gap analysis may be based on DVB and MPEG-DASH audio metadata. This example may address the issues such as how to differentiate single decoder vs. multiple decoder offerings; for single decoder indication of an entry point, whether it is necessary to define the sequence on how to initiate, provision of tools that describe the dependencies for rendering on media stream level, provision of tools to avoid a specific Adaptation Set from being selected if the Adaptation Set is not a main Adaptation Set, and use of quality ranking to find matching Representations in different ASs. The quality rankings of various Adaptation Sets may generally represent relative quality ranking attributes for the Adaptation Sets, and/or for Representations included in the Adaptation Sets.

In this example, Systems layer unit 324 may exclude certain Adaptation Sets that are not to be selected independently. In one example, a new element is introduced that is similar to Adaptation Sets, but includes Adaptation Set dependencies and single codec signalling. In another example, an essential descriptor is used with Adaptation Sets, where the essential descriptor describes Adaptation Set dependencies and single codec signalling.

Furthermore, the metadata may describe dependency information for Adaptation Sets that tells a DASH client which Adaptation Sets need to be selected when a dependent Adaptation Set is selected, that all of the Adaptations Sets include media data encoded using the same codec, and the sequence of processing to be handed to the codec. Moreover, the @qualityRanking attribute in DASH MPD may be used to support the selection of proper Representations for each Adaptation Set.

Examples of signaling related to an Essential Descriptor and a Partial Adaptation Set are provided below:
Essential Descriptor
  AS: @id=1;
    EssentialProperty (do not present independently)
    Rep1: @qualityRanking=2 @bandwidth=32
    Rep2: @qualityRanking=1 @bandwidth=64
  AS: @id=2; @lang=en
    EssentialProperty (presentation dependency, @value=1,2)
    Role(urn:mpeg:dash:role:2011, value="main")
    Rep1: @qualityRanking=2 @bandwidth=64
    Rep2: @qualityRanking=1 @bandwidth=128
  AS: @id=3; @lang=de
    EssentialProperty (presentation dependency, @value=1,3)
    Role(urn:mpeg:dash:role:2011, value="main")
    Role(urn:mpeg:dash:role:2011, value="dub")
    Rep1: @qualityRanking=2 @bandwidth=64
    Rep2: @qualityRanking=1 @bandwidth=128
  AS: @id=4; @lang=en
    EssentialProperty (presentation dependency, @value=1,4)
    Role(urn:mpeg:dash:role:2011, value="commentary")
    Rep1: @qualityRanking=2 @bandwidth=64
    Rep2: @qualityRanking=1 @bandwidth=128
  AS: @id=5; @lang=de
    EssentialProperty (presentation dependency, @value=1,3,5, @id="deutscher-kommentar")
    EssentialProperty (presentation dependency, @value=1,5 @id="deutscher-kommentar")
    Role(urn:mpeg:dash:role:2011, value="commentary")
    Rep1: @qualityRanking=2 @bandwidth=64
    Rep2: @qualityRanking=1 @bandwidth=12
Partial Adaptation Set examples are described below:
PartialAS: @id=1; @present=FALSE
    Rep1: @qualityRanking=2 @bandwidth=32
    Rep2: @qualityRanking=1 @bandwidth=64
PartialAS: @id=2; @lang=en; @present=TRUE, @sequence=1,2
    Role(urn:mpeg:dash:role:2011, value="main")
    Rep1: @qualityRanking=2 @bandwidth=64
    Rep2: @qualityRanking=1 @bandwidth=128
PartialAS: @id=3; @lang=de; @present=TRUE, @sequence=1,3
    Role(urn:mpeg:dash:role:2011, value="main")
    Role(urn:mpeg:dash:role:2011, value="dub")
    Rep1: @qualityRanking=2 @bandwidth=64
    Rep2: @qualityRanking=1 @bandwidth=128
PartialAS: @id=4; @lang=en; @present=TRUE, @sequence=1,4
    Role(urn:mpeg:dash:role:2011, value="commentary")
    Rep1: @qualityRanking=2 @bandwidth=64
    Rep2: @qualityRanking=1 @bandwidth=128
PartialAS: @id=5; @lang=de; @present=TRUE, @sequence=1,3,5
    Role(urn:mpeg:dash:role:2011, value="commentary")
    Rep1: @qualityRanking=2 @bandwidth=64
    Rep2: @qualityRanking=1 @bandwidth=128

In another alternative, Systems metadata 302, 306, 310, 314, 318 may describe various presentations (where each of the presentations corresponds to one of a variety of combinations of audio objects/streams). Systems layer unit 324 may then select one presentation. In one example, the presentations may describe the streams, and Systems layer unit 324 may select the individual streams based on the selected presentation. In another example, the presentations may be abstract, and Systems layer unit 324 may forward all streams to selection unit 322.

As one example, presentations may be offered by a content author. The content author may define restricted sets of combinations, such as the following:
  Presentation 1: M&E stream 304, English dialogue stream 308
  Presentation 2: M&E stream 304, German dialogue stream 312
  Presentation 3: M&E stream 304, English dialogue stream 308, English commentary stream 316
  Presentation 4: M&E stream 304, German dialogue stream 312, German commentary 320

In this example, system 300 may perform a DASH gap analysis. This example may address the issues such as how to differentiate single decoder vs. multiple decoder offerings; for single decoder indication of an entry point, whether it is necessary to define the sequence on how to initiate; provision of tools that describe the compilation of presentation; and provision of tools to avoid a specific Adaptation Set from being selected if the Adaptation Set is not to be selected independently.

In one example, a new Presentation element may be used to collect the metadata and compilation of Presentations. Dependency data may be used for Adaptation Sets to indicate to a DASH client which Adaptation Sets need to be selected in addition to the selected Adaptation Set, that all of the Adaptation Sets include media data coded using the same codec, and the sequence of processing to be handed to the codec.

In some examples, all Adaptation Sets that are included in a presentation to be selected may be excluded from the Presentation element. In one example, a new Element that is essentially equivalent to an Adaptation Set, but includes no signaling for audio related parameters, is signaled in the manifest file. In another example, an essential descriptor is provided with an Adaptation set. In some examples, an @qualityRanking attribute in DASH MPD is signaled to support the selection of proper Representations for each Adaptation Set.

In this manner, system 300 of FIG. 7 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Figure 8:
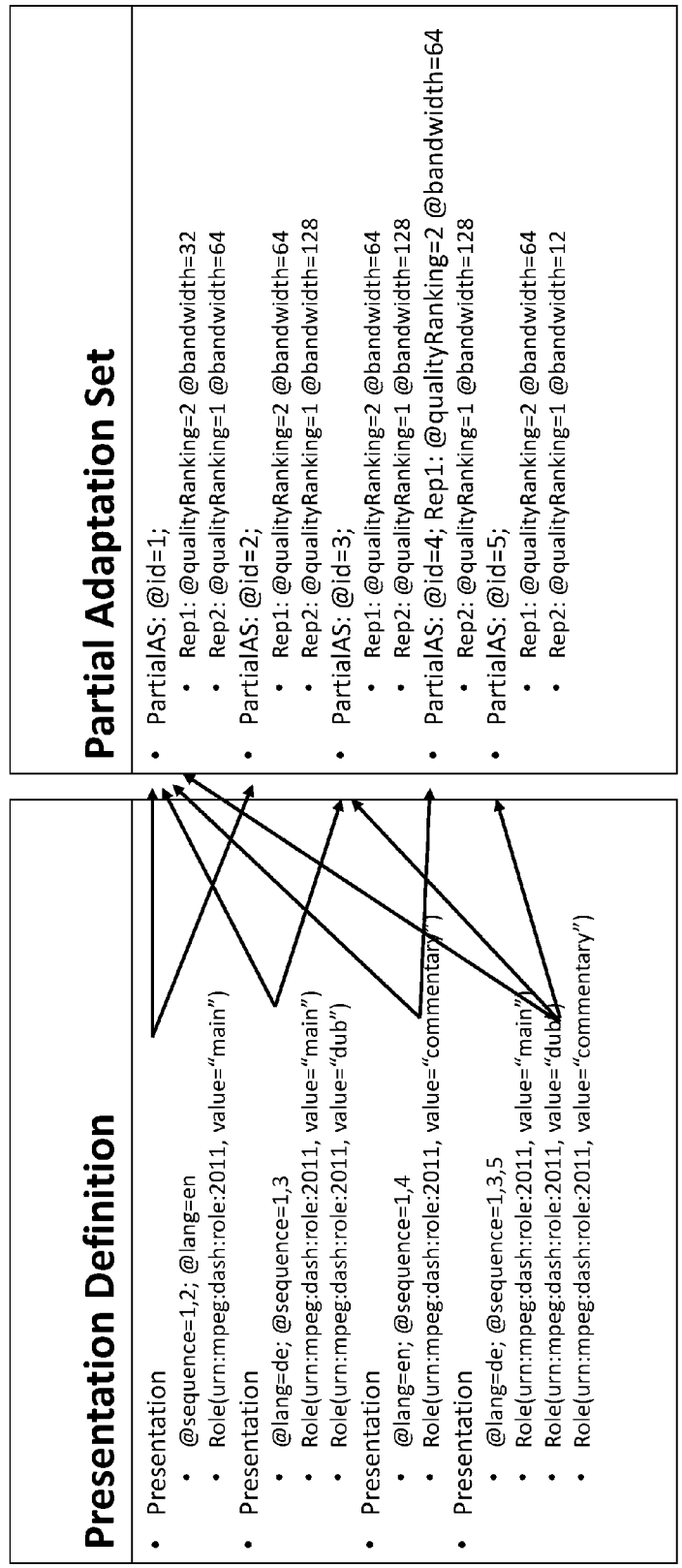
FIG. 8 is a conceptual diagram illustrating a mapping between presentation definitions and examples of partial adaptation sets.

FIG. 8 is a conceptual diagram illustrating a mapping between presentation definitions and examples of partial adaptation sets. In this example, there are four partial Adaptation sets, having ID values 1, 2, 3, 4, and 5. For example, Adaptation Set 1 may represent an M&E stream, Adaptation Set 2 may represent an English language dialogue stream, Adaptation Set 3 may represent a German language dialogue stream, Adaptation Set 4 may represent an English language commentary stream, and Adaptation Set 5 may represent a German language dialogue stream. Each partial Adaptation Set includes two respective Representations, with signaled quality ranking values (@qualityRanking) and bandiwidth values (@bandwidth).

Furthermore, in this example, there are four Presentations, where each Presentation represents a combination of one or more of the partial Adaptation Sets. A first Presentation includes the partial Adaptation Sets having ID values 1 and 2. A second Presentation includes the partial Adaptation Sets having ID values 1 and 3. A third Presentation includes the partial Adaptation Sets having ID values 1 and 4. A fourth Presentation includes the partial Adaptation Sets having ID values 1, 3, and 5.

Figure 9:
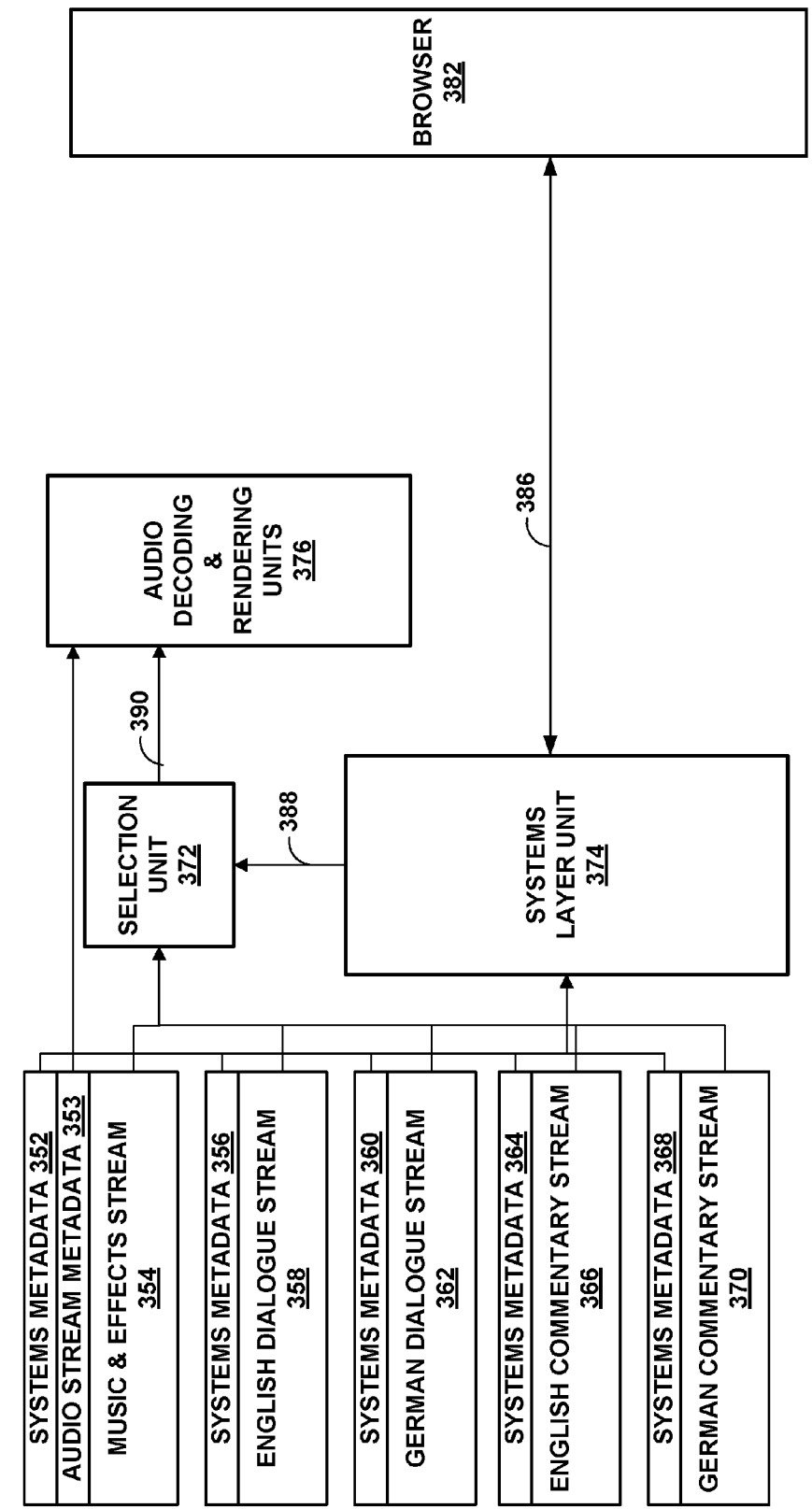
FIG. 9 is a conceptual diagram illustrating another example that uses Systems and HTML-5.

FIG. 9 is a conceptual diagram illustrating another example system 350 that uses Systems layer processing and HTML-5. In this example, system 350 includes selection unit 372, Systems layer unit 374, audio decoding & rendering units 376, and browser 382. Systems layer unit 374, in this example, selects from available audio data based on audio stream metadata 353 that is provided with M&E stream 354, and based on input 386 from browser 382. Audio stream metadata 353 may be included in, for example, a manifest file, such as an MPD of DASH.

In this example, audio decoding & rendering units 376 receives audio stream metadata 353. Audio stream metadata 353, in this example, includes availability data indicating which sets of audio data are available. In this example, the available audio data includes M&E stream 354 (accompanied by Systems metadata 352 and audio stream metadata 353), English dialogue stream 358 (accompanied by Systems metadata 356), German dialogue stream 362 (accompanied by Systems metadata 360), English commentary stream 366 (accompanied by Systems metadata 364), and German commentary stream 370 (accompanied by Systems metadata 368).

The example of FIG. 9 is similar to the example of FIG. 7 as discussed above, except that Systems layer unit 374 includes network capabilities and receives input from web browser 382 to aid in selections of available audio streams. The same decision process as described with respect to the example of FIG. 7 may be used for the example of FIG. 9. Web browser 382 may provide selection data 386 to Systems layer unit 374 according to W3C sourcing in-band media resource tracks.

In general, the techniques discussed above with respect to FIG. 7 may also be performed by system 350 of FIG. 9, except that Systems layer unit 374 may be configured to decompose and map presentations to HTML-5 presentations, in some examples. That is, a user may provide input representing selected audio streams via browser 382, which sends selection data 386 to Systems layer unit 374. Systems layer unit 374 processes selection data 386 and sends corresponding selection data 388 to selection unit 372. Selection unit 372 then uses selection data 386 to extract the corresponding selected audio data and forward the selected audio data 390 to audio decoding & rendering units 376.

In this manner, system 350 of FIG. 9 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Figure 10:
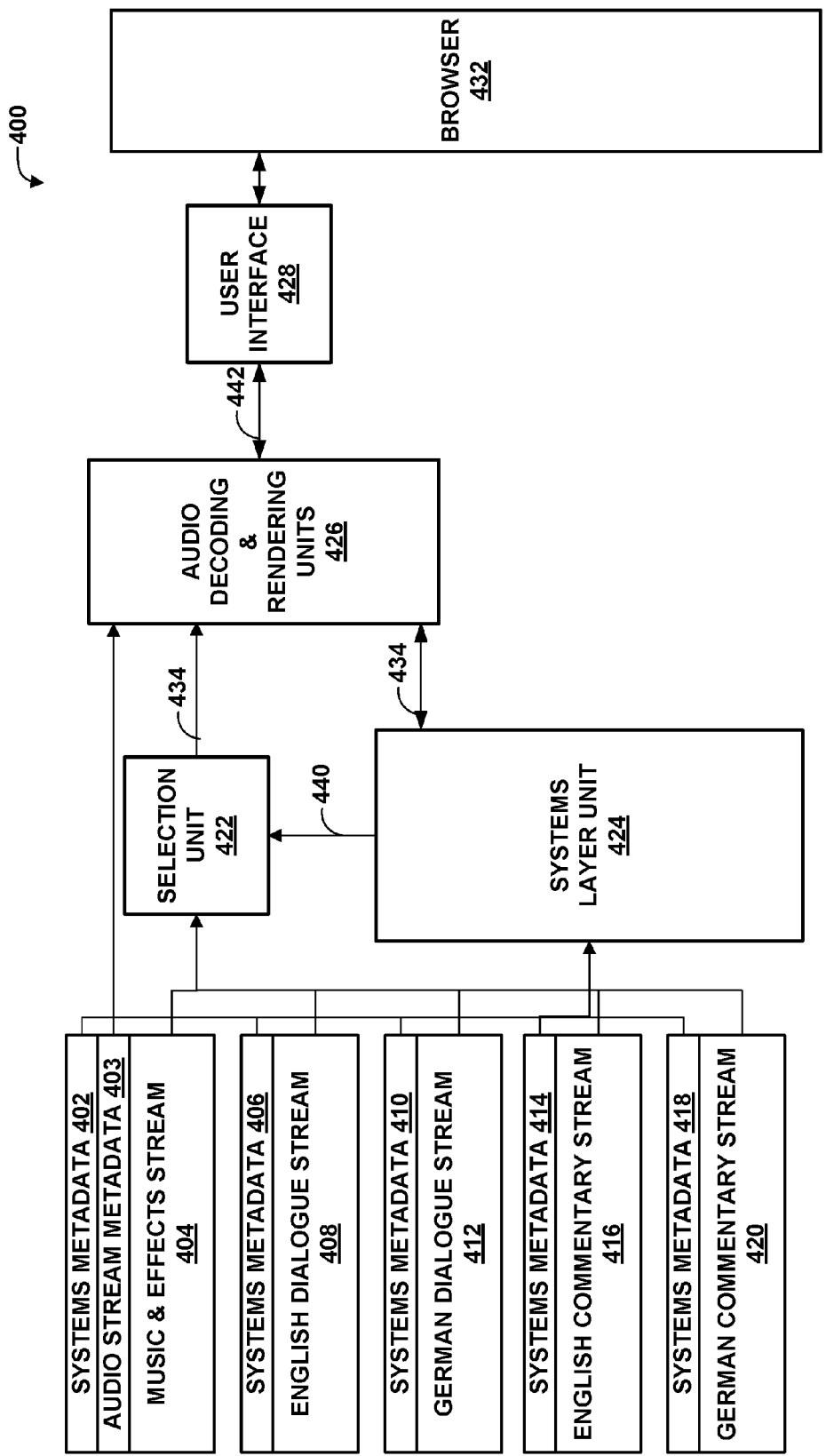
FIG. 10 is a conceptual diagram illustrating another example system that uses Systems and an audio decoder.

FIG. 10 is a conceptual diagram illustrating another example system 400 that uses Systems layer information and an audio decoder. In this example, system 400 includes selection unit 422, Systems layer unit 424, audio decoding & rendering unit 426, user interface 428, and browser 432. This example is also similar to the example of FIG. 7 as discussed above, except that Systems layer unit 424 interacts with audio decoding & rendering units 426 to select from available audio streams.

In this example, audio decoding & rendering units 426 receives audio stream metadata 403. Audio stream metadata 403 may be included in, for example, a manifest file, such as an MPD of DASH. Audio stream metadata 403, in this example, includes availability data indicating which sets of audio data are available. In this example, the available audio data includes M&E stream 404 (accompanied by Systems metadata 402 and audio stream metadata 403), English dialogue stream 408 (accompanied by Systems metadata 406), German dialogue stream 412 (accompanied by Systems metadata 410), English commentary stream 416 (accompanied by Systems metadata 414), and German commentary stream 420 (accompanied by Systems metadata 418).

In this example, Systems layer unit 424 has data representative of network capabilities and delivery network of each media stream, and decoding capabilities of audio decoding & rendering units 426. In this example, Systems layer unit 424 does not need to process certain metadata. The audio decoding unit of audio decoding and rendering units 426 is configured with information representing rendering capabilities of the rendering unit thereof, as well as metadata assigned to each media stream. This metadata may be much richer than conventional metadata defined for the Systems layer.

Further, Systems layer unit 424 may be configured to prune the available streams based on network capabilities and the decoding capabilities. Systems layer unit 424 may then provide data 440 indicating all available streams, based on network capabilities, to the audio decoding unit of audio decoding & rendering units 426. The audio decoding unit of audio decoding & rendering units 426 may then send data 434 to Systems layer unit 424, which indicates what streams are (or are not) needed. Systems layer unit 424 may then deselect streams according to data 434. This selection may be dynamic.

In this manner, system 400 of FIG. 10 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Figure 11:
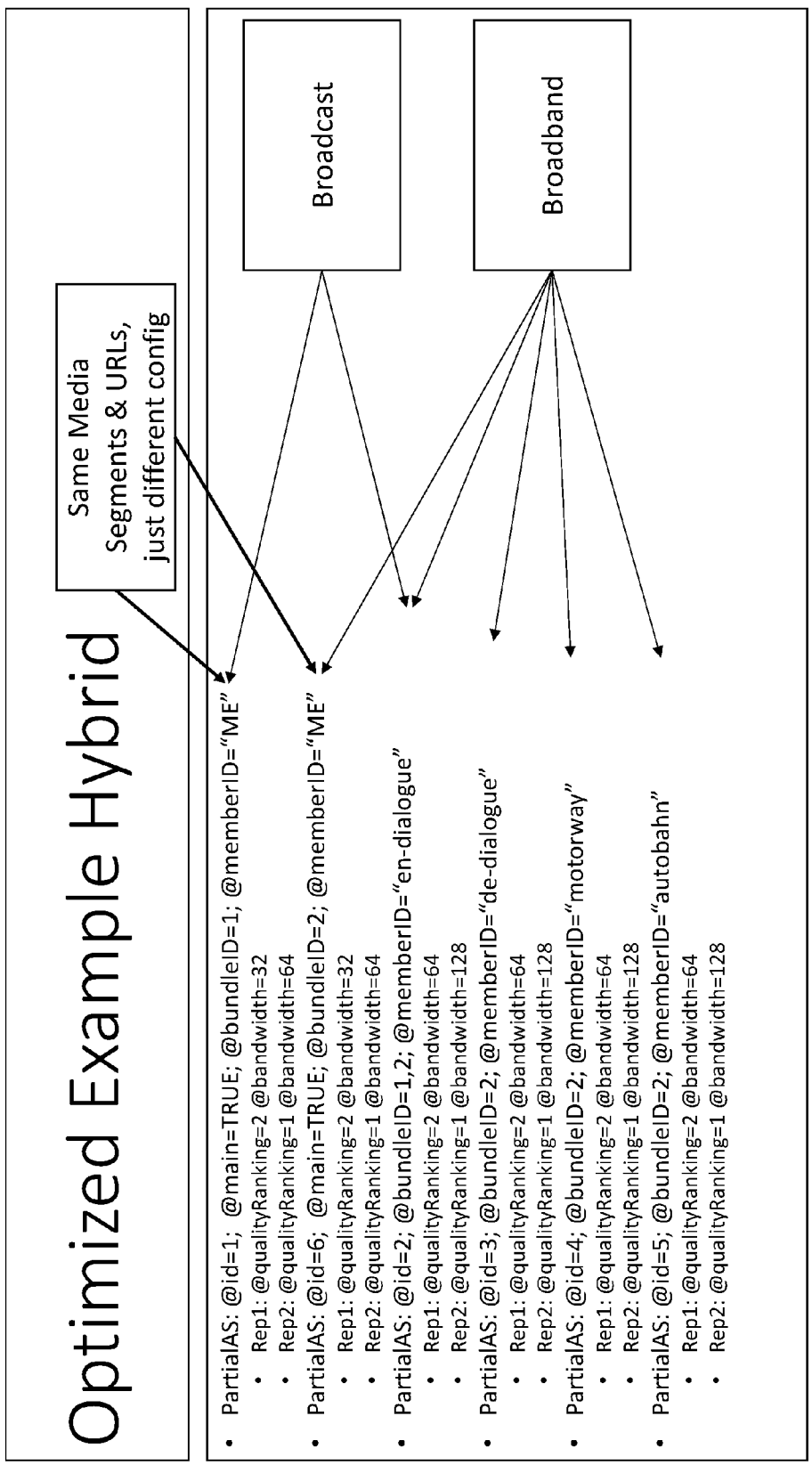
FIG. 11 is a conceptual diagram illustrating an example set of data and a correspondence between values for @bundleID and availability via various types of delivery networks.

FIG. 11 is a conceptual diagram illustrating an example set of data and a correspondence between values for @bundleID and availability via various types of delivery networks. In this example, @bundleID=1 indicates that a partial adaptation set is available via broadcast, while @bundleID=2 indicates that a partial adaptation set is available via broadband (e.g., for unicast retrieval). In this example, the partial adaptation sets having @id values 1 and 6 include the same media segments and URLs, but different configuration information.

Data according to the proposal of MPEG document M37191, which is used in the example of FIG. 11, includes:

| Element or Attribute Name | Use | Description |
| --- | --- | --- |
| PartialAdaptation Set | | Partial Adaptation Set of type Adaptation Set with the extensions provided below |
| @codecs | | Set, for example, to mha (only set if @present is true) |
| @isMain | OD False | When this flag is set to true, the Partial adaptation set (AS) contains a MPEG-H main stream with a valid AudioSceneInformation and "isMainStream" set to "1" in the MHAMultiStreamBox( ), as defined in [MHA-AMD2]. |
| @memberID | M | The unique ID of the audio stream contained in the Partial AS that is mapped to the thisStreamID in the MHAMultiStreamBox( ), as defined in [MHA-AMD2]. |
| @bundleID | M | The unique ID of the AudioSceneInformation. corresponding to the mae_audioSceneID, as defined in [MHA-AMD2]. |

These data elements may be assigned values as follows:
PartialAdaptationSet data may signal that potentially a single Adaptation Set cannot be used
@bundleID may signal that all Adaptation Sets belong to one single decoder
@isMain may provide the entry point to multiple Adaptation Sets
@memberID may annotate all Adaptation Sets such that they can be referred to by the audio decoder
Note that a PartialAdaptationSet can be a member of multiple bundles for better hybrid support.
The data set shown in the example of FIG. 11 is:
PartialAS: @id=1; @main=TRUE; @bundleID=1; @memberID="ME"
  Rep1: @qualityRanking=2 @bandwidth=32
  Rep2: @qualityRanking=1 @bandwidth=64
PartialAS: @id=2; @bundleID=1; @memberID="en-dialogue"
  Rep1: @qualityRanking=2 @bandwidth=64
  Rep2: @qualityRanking=1 @bandwidth=128
PartialAS: @id=3; @bundleID=1; @memberID="de-dialog"
  Rep1: @qualityRanking=2 @bandwidth=64
  Rep2: @qualityRanking=1 @bandwidth=128
PartialAS: @id=4; @bundleID=1; @memberID="motorway"
  Rep1: @qualityRanking=2 @bandwidth=64
  Rep2: @qualityRanking=1 @bandwidth=128
PartialAS: @id=5; @bundleID=1; @memberID="autobahn"
  Rep1: @qualityRanking=2 @bandwidth=64
  Rep2: @qualityRanking=1 @bandwidth=128

Figure 12:
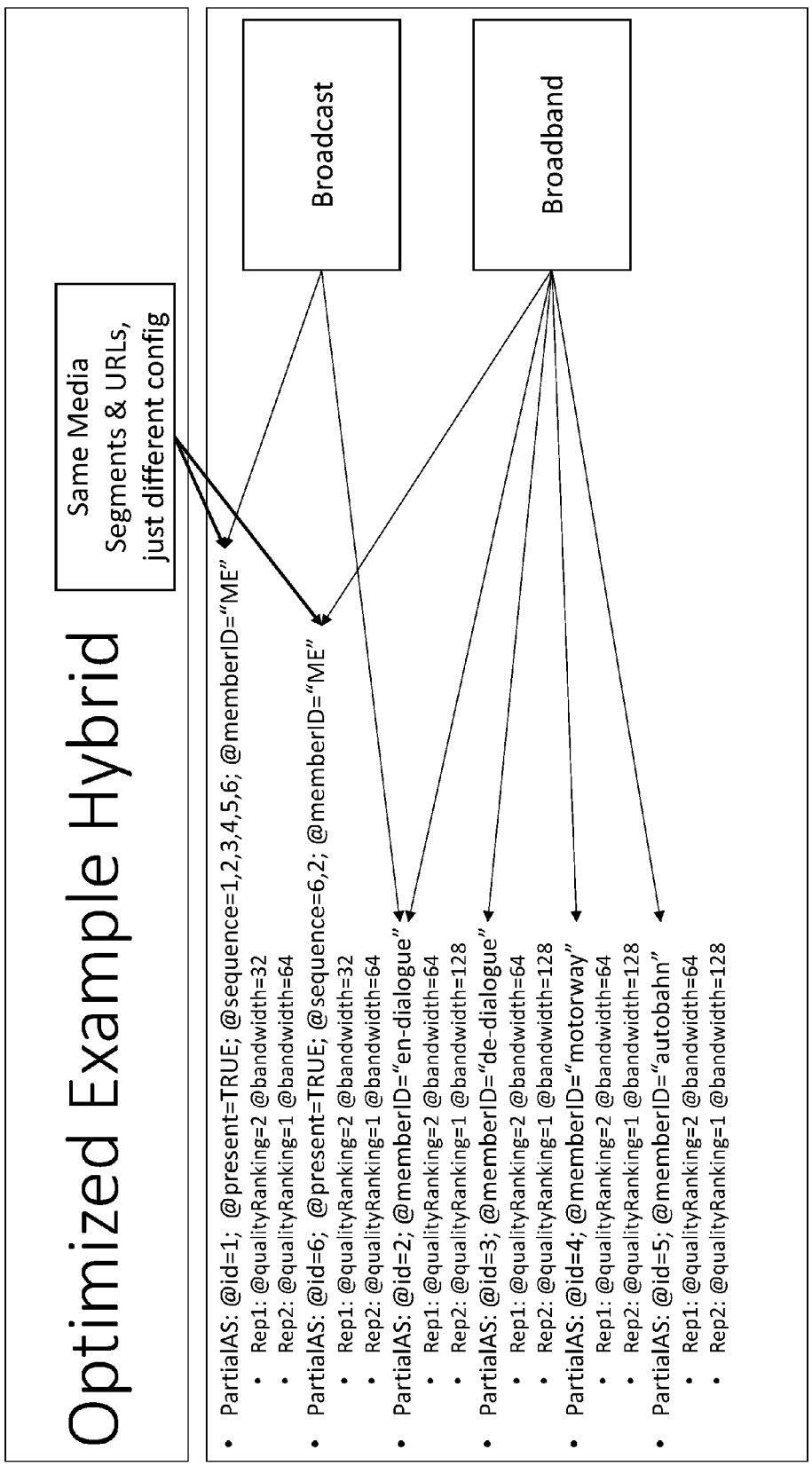
FIG. 12 is a conceptual diagram illustrating an example of data network availabilities for an example set of partial adaptation sets.

FIG. 12 is a conceptual diagram illustrating an example of data network availabilities for an example set of partial adaptation sets. The example of FIG. 12 is provided as an alternative to the example of FIG. 11.

| Element or Attribute Name | Use | Description |
| --- | --- | --- |
| PartialAdaptation Set | | Partial Adaptation Set of type Adaptation Set with the extensions provided below |
| @codecs | | Set to mha |
| @present | OD False | When this flag is set to true, the Partial AS may be presented together with the remaining partial ASs which are included in the sequence starting |
| @sequence | CM | Must be present if @present set to TRUE. Provides the necessary Adaptation Sets that need to be presented and also the sequence. |
| @memberID | M | The unique ID of the audio stream contained in the Partial AS that is mapped to the |

| Element or Attribute Name | Use | Description |
|---|---|---|
| | | thisStreamID in the MHAMultiStreamBox( ), as defined in [MHA-AMD2]. |

The data elements may be used as follows:
PartialAdaptationSet may signal that potentially a single Adaptation Set cannot be used
Part of the @sequence values may signal that all Adaptation Sets belong to one single decoder
The first value of @sequence may provide the entry point to multiple Adaptation Sets
@memberID may annotate all Adaptation Sets such that they can be referred to by the audio decoder
NOTE: @bundleID, as discussed with respect to the example of FIG. 11 above, may be used in addition to the data above, to signal one decoder instance
The data set shown in the example of FIG. 12 is:
PartialAS: @id=1; @present=TRUE; @sequence=1,2,3,4,5; @memberID="ME"
  Rep1: @qualityRanking=2 @bandwidth=32
  Rep2: @qualityRanking=1 @bandwidth=64
PartialAS: @id=2; @memberID="en-dialogue"
  Rep1: @qualityRanking=2 @bandwidth=64
  Rep2: @qualityRanking=1 @bandwidth=128
PartialAS: @id=3; @memberID="de-dialog"
  Rep1: @qualityRanking=2 @bandwidth=64
  Rep2: @qualityRanking=1 @bandwidth=128
PartialAS: @id=4; @memberID="motorway"
  Rep1: @qualityRanking=2 @bandwidth=64
  Rep2: @qualityRanking=1 @bandwidth=128
PartialAS: @id=5; @memberID="autobahn"
  Rep1: @qualityRanking=2 @bandwidth=64
  Rep2: @qualityRanking=1 @bandwidth=128

Figure 13:
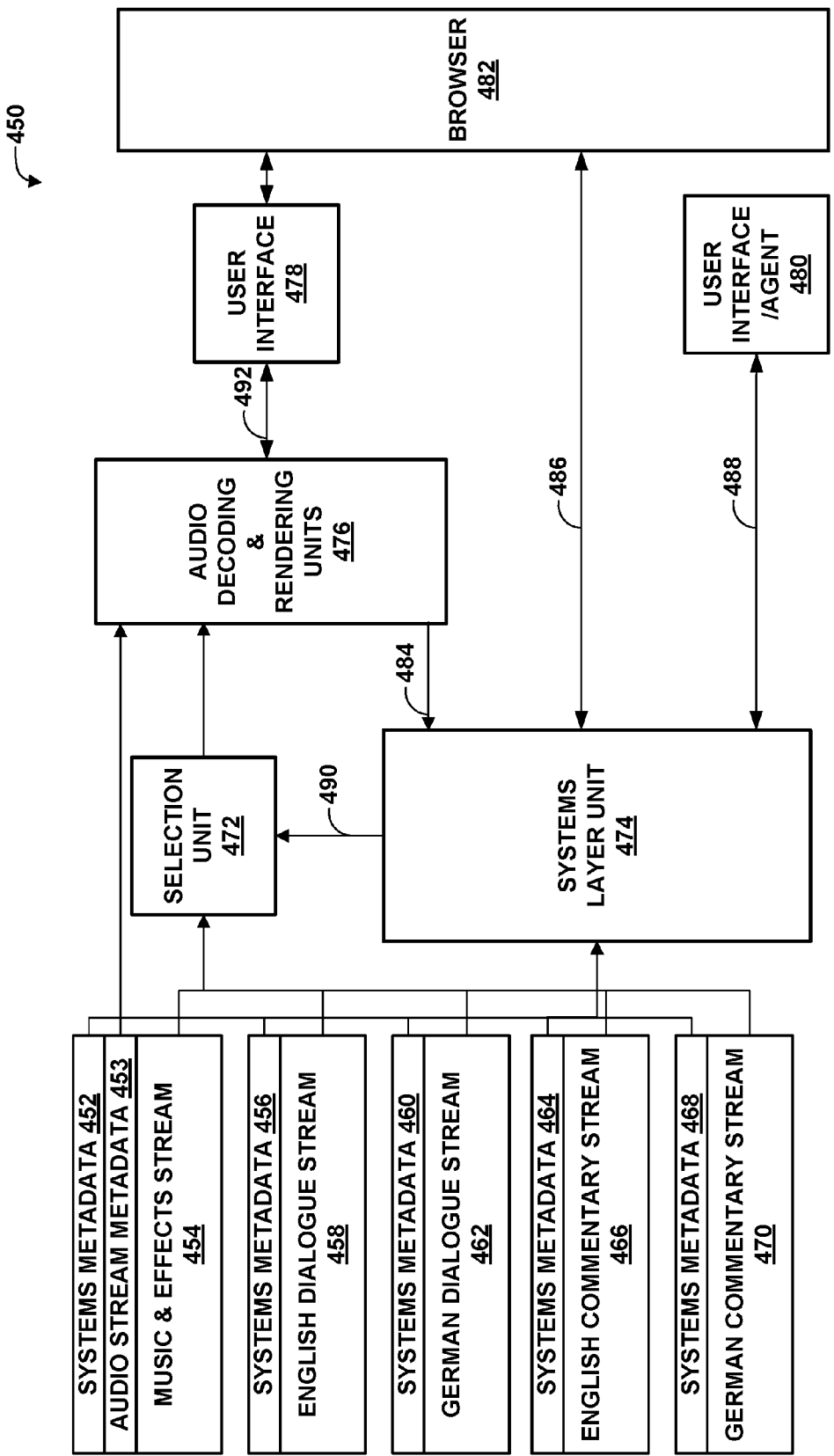
FIG. 13 is a conceptual diagram illustrating another example system that uses a variety of selection techniques in accordance with the techniques of this disclosure.

FIG. 13 is a conceptual diagram illustrating another example system 450 that uses a variety of selection techniques in accordance with the techniques of this disclosure. The example of System 450 includes selection unit 472, Systems layer unit 474, audio decoding & rendering units 476, user interface 478, user interface/agent 480, and browser 482. In this example, Systems layer unit 474 may receive selection data from any or all of user interface/agent 480 (associated with Systems layer unit 474), web browser 482, and/or the audio decoding unit of audio decoding & rendering units 476.

In this example, audio decoding & rendering units 476 receives audio stream metadata 453. Audio stream metadata 453 may be included in, for example, a manifest file, such as an MPD of DASH. Audio stream metadata 453, in this example, includes availability data indicating which sets of audio data are available. In this example, the available audio data includes M&E stream 454 (accompanied by Systems metadata 452 and audio stream metadata 453), English dialogue stream 458 (accompanied by Systems metadata 456), German dialogue stream 462 (accompanied by Systems metadata 460), English commentary stream 466 (accompanied by Systems metadata 464), and German commentary stream 470 (accompanied by Systems metadata 468).

In accordance with the example of FIG. 13, Systems layer unit 474 may have data representing network capabilities and delivery network for each media stream, capabilities of the audio decoding unit of audio decoding & rendering units 476, and basic Systems metadata, such as language and accessibility. The audio decoding unit of audio decoding & rendering units 476 may have data representing capabilities of the audio rendering unit of audio decoding & rendering units 476 and metadata assigned to each media stream. In this example, the metadata may be much richer than conventional Systems level metadata.

Systems layer unit 474 may prune available streams based on network capabilities, decoding capabilities, and basic system metadata. Systems layer unit 474 may then provide data representing remaining streams that are available based on network capabilities and system metadata to the audio decoding unit of audio decoding & rendering units 476. The audio decoding unit provides data 484 to System layer unit 474 indicating what streams are (and/or are not) needed. In response, Systems layer unit 474 may select or deselect the streams according to this information. This selection may be dynamic. Furthermore, user interface/agent 480 may provide additional selection information 488 to Systems layer unit 474, and/or browser 482 may provide additional selection information 486 to Systems layer unit 474. Audio decoding & rendering units 476 may use selection information 492 received from user interface 478 to determine which streams are or are not needed. Ultimately, Systems layer unit 474 may provide selection data 490 to selection unit 472, which may forward the selected streams to audio decoding & rendering units 476.

The following discussion relates to a DASH gap analysis for the example of FIG. 13:
Duplicating information sounds attractive, but is more complex, as we need to understand the details of how to duplicate, what it means in terms of selection, and so on
Options include:
  Preselection on system level
    Need to check the details
    Combinations of the various examples discussed above may be possible
  Duplication such that the receiver does have choices on implementation
    Need to check the details An example data set in accordance with the example of FIG. 13 is shown below:
Language on system level, detailed selection of media stream in MPEG-H audio decoder
PartialAS: @id=1; @present=FALSE; @memberID="ME"
  Rep1: @qualityRanking=2 @bandwidth=32
  Rep2: @qualityRanking=1 @bandwidth=64
PartialAS: @id=2; @lang=en; @present=FALSE; @memberID="en-dialogue"
  Rep1: @qualityRanking=2 @bandwidth=64
  Rep2: @qualityRanking=1 @bandwidth=128
PartialAS: @id=3; @lang=de; @present=FALSE; @memberID="de-dialog"
  Rep1: @qualityRanking=2 @bandwidth=64
  Rep2: @qualityRanking=1 @bandwidth=128
PartialAS: @id=4; @lang=en; @present=TRUE; @sequence=1,2,4; @memberID="motorway"
  Rep1: @qualityRanking=2 @bandwidth=64
  Rep2: @qualityRanking=1 @bandwidth=128
PartialAS: @id=5; @lang=de; @present=TRUE; @sequence=1,3,5; @memberID="autobahn"
  Rep1: @qualityRanking=2 @bandwidth=64
  Rep2: @qualityRanking=1 @bandwidth=128

Processing steps that may be performed by the example system of FIG. 13, based on the example data set above, include:

Based on system information, Systems layer unit 474 may select either ASs 1, 2, or 4 if English is chosen or ASs 1, 3, or 5 if German is chosen.

The audio decoding unit of audio decoding & rendering units 476, if capable, may provide data to Systems layer unit 474 indicating whether particular audio data, such as the commentary, should not be selected, or if Systems layer unit 474 may overwrite the choice of the system.

This therefore allows different implementations.

An example of a data set for use in a hybrid system with Systems selection is shown below:

PartialAS: @id=1; @present=FALSE; @sequence=1,2,3,4,5; @memberID="ME";
  Rep1: @qualityRanking=2 @bandwidth=32
  Rep2: @qualityRanking=1 @bandwidth=64
PartialAS: @id=6; @present=FALSE; @sequence=1,2; @memberID="ME"
  Rep1: @qualityRanking=2 @bandwidth=32
  Rep2: @qualityRanking=1 @bandwidth=64
PartialAS: @id=2; @lang=en; @memberID="en-dialogue"
  Rep1: @qualityRanking=2 @bandwidth=64
  Rep2: @qualityRanking=1 @bandwidth=128
PartialAS: @id=3; @lang=de; @bundleID=2; @memberID="de-dialogue"
  Rep1: @qualityRanking=2 @bandwidth=64
  Rep2: @qualityRanking=1 @bandwidth=128
PartialAS: @id=4; @lang=en; @bundleID=2; @memberID="motorway"
  Rep1: @qualityRanking=2 @bandwidth=64
  Rep2: @qualityRanking=1 @bandwidth=128
PartialAS: @id=5; @lang=de; @bundleID=2; @memberID="autobahn"
  Rep1: @qualityRanking=2 @bandwidth=64
  Rep2: @qualityRanking=1 @bandwidth=128

In this manner, the techniques of this disclosure may be used for many use cases on System and audio decoder levels. These techniques take account of different aspects of signaling and implementations, such as system and audio codec selection and network capabilities, both broadcast and hybrid.

One example solution in accordance with the techniques of this disclosure may include data as shown below:

| Element or Attribute Name | Use | Description |
| --- | --- | --- |
| PartialAdaptationSet | | Partial Adaptation Set of type Adaptation Set with the extensions provided below |
| @codecs | | Set to mha |
| @present | OD False | When this flag is set to true, the Partial AS may be presented together with the remaining partial ASs which are included in the sequence starting |
| @sequence | CM | Must be present if @present set to TRUE. Provides the necessary Adaptation Sets that need to be presented and also the sequence. |
| @memberID | OD is 0 | The unique ID of the audio stream contained in the Partial AS that is mapped to the thisStreamID in the MHAMultiStreamBox( ), as defined in [MHA-AMD2]. |
| @bundleID | OD is 0 | All Partial AS belong with the same value for bundle ID belong to the same codec instance |

Values for these data elements may be set as follows:

PartialAdaptationSet may signal that potentially a single Adaptation Set cannot be used.

Part of the @sequence elements may signal that all Adaptation Sets belong to a single decoder.

The first value of @sequence may provide the entry point to multiple Adaptation Sets.

The value of @memberID may annotate all Adaptation Sets such that they can be referred to by the audio decoder.

The value of @bundleID may be used to signal one decoder instance, as discussed above.

In this manner, system 450 of FIG. 13 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Figure 14:
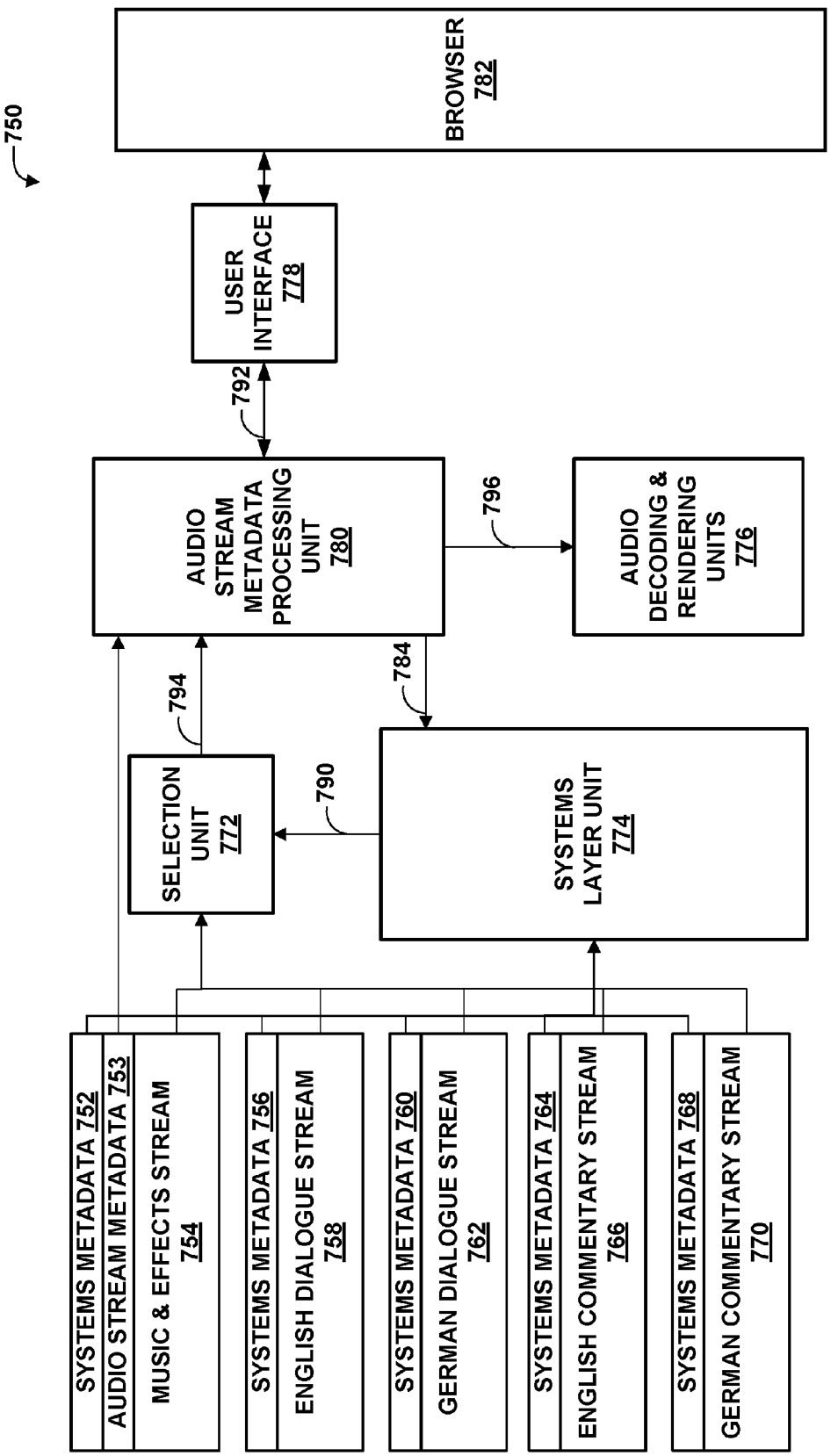
FIG. 14 is a conceptual diagram illustrating another example system in accordance with the techniques of this disclosure that uses Systems and an audio decoder.

FIG. 14 is a conceptual diagram illustrating another example system 750 in accordance with the techniques of this disclosure that uses Systems layer data and an audio decoder. That is, system 750 includes selection unit 772, Systems layer unit 774, audio stream metadata processing unit 780, audio decoding & rendering units 776, user interface 778, and browser 782.

In this example, audio stream metadata processing unit 780 receives audio stream metadata 753. Audio stream metadata 753 may be included in, for example, a manifest file, such as an MPD of DASH. Audio stream metadata 753, in this example, includes availability data indicating which sets of audio data are available. In this example, the available audio data includes M&E stream 754 (accompanied by Systems metadata 752 and audio stream metadata 753), English dialogue stream 758 (accompanied by Systems metadata 756), German dialogue stream 762 (accompanied by Systems metadata 760), English commentary stream 766 (accompanied by Systems metadata 764), and German commentary stream 770 (accompanied by Systems metadata 768).

The example of FIG. 14 represents an alternative to the example of FIG. 13. In particular, rather than an audio decoder and renderer that interacts with a Systems layer unit as shown in FIG. 13, in the example of FIG. 14, audio stream metadata processing unit 780 interacts with Systems layer unit 774, and provides data 784 to Systems layer unit 774 for pruning available media streams, potentially based on selection data 792. Systems layer unit 774 provides selection data 790 to selection unit 772, which forwards data of selected streams to audio stream metadata processing unit 780. Audio stream metadata processing unit 780, in turn, provides media data 796 to audio decoding & rendering units 776.

Figure 15:
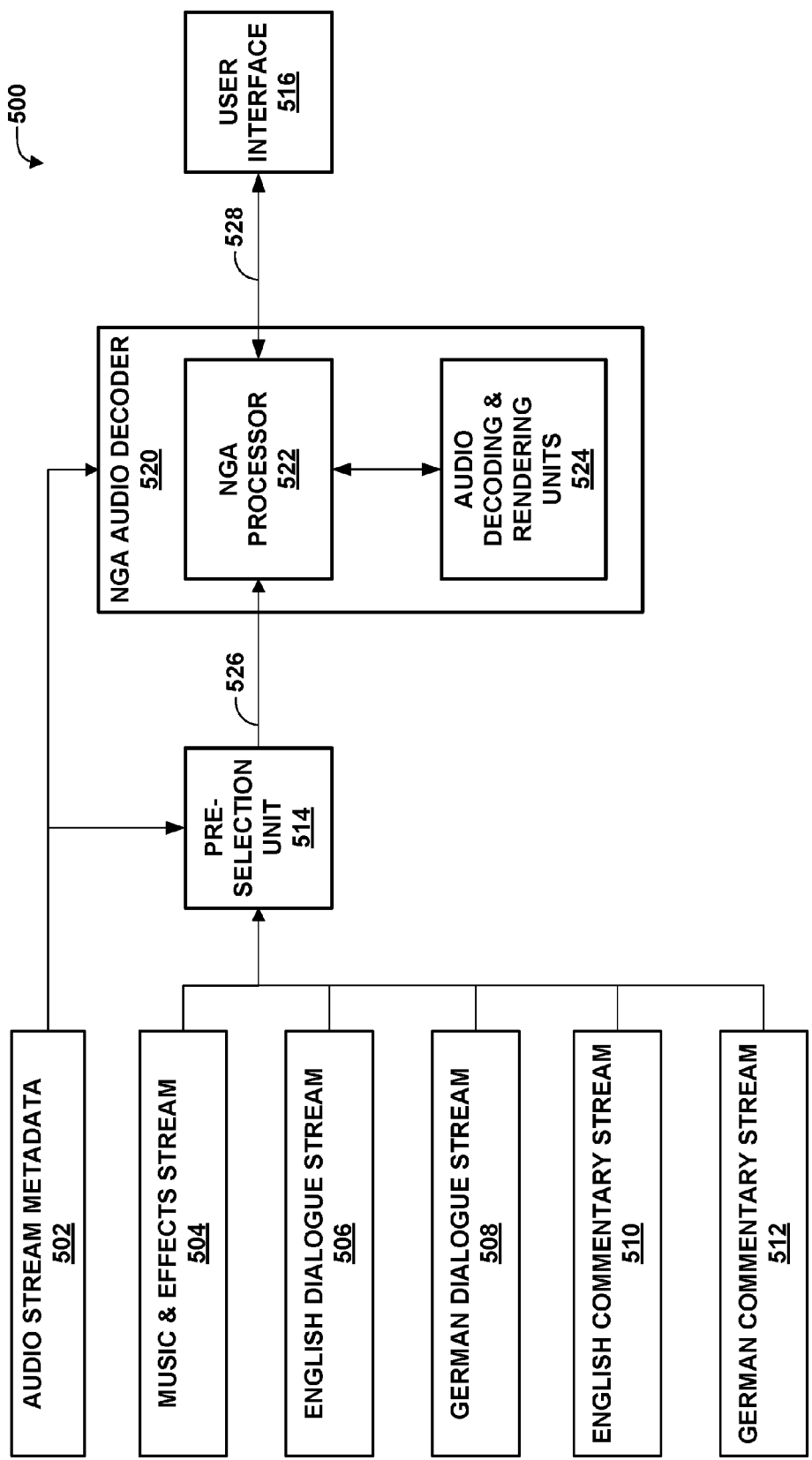
FIGS. 15-17 are conceptual diagrams illustrating example audio data models in accordance with the techniques of this disclosure.
Figure 16:
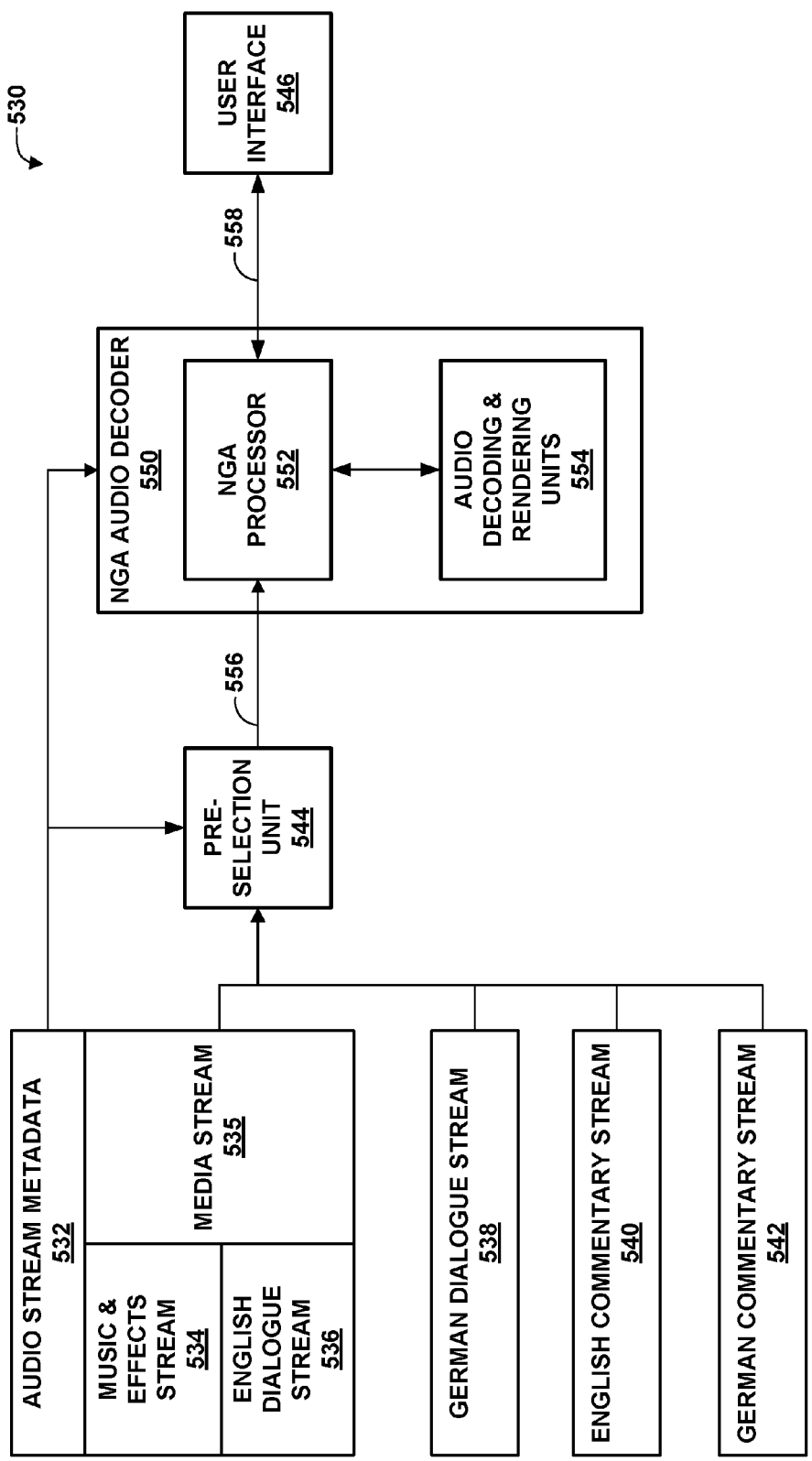
Figure 17:
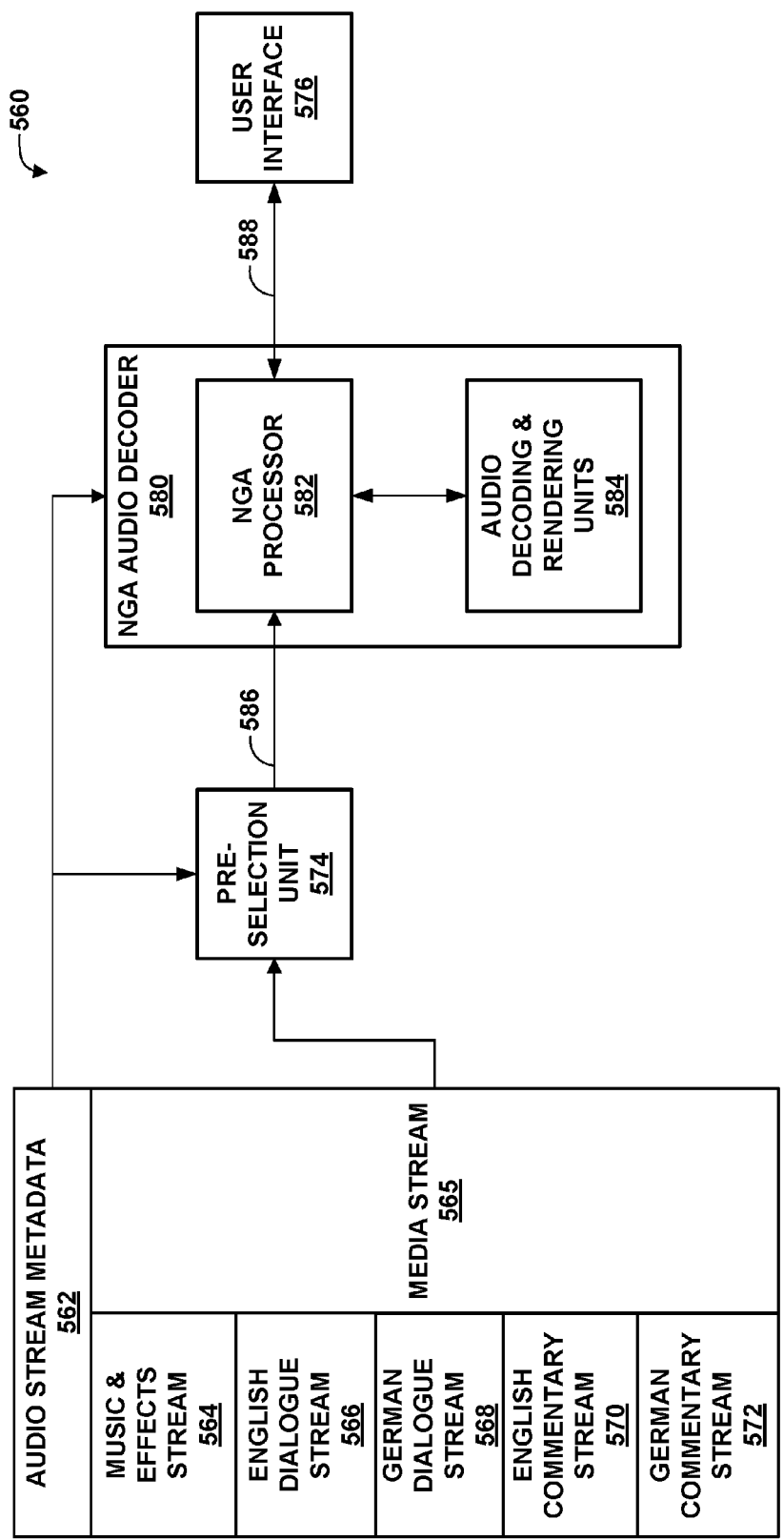

FIGS. 15-17 are conceptual diagrams illustrating example audio data models in accordance with the techniques of this disclosure. In general, the audio data models of FIGS. 15-17 conform to the following characteristics:

Audio Bundle: A set of streams (objects/Adaptation Sets) that are consumed by a single next generation audio (NGA) decoder instance
    Relevant on system level
  Preselection: A number of streams from one bundle, that can be selected and provide a useful presentation
    Mostly relevant on system level Main Stream: The stream that contains the decoder specific information (audio metadata) bootstrap the decoder for the entire bundle
Mostly relevant on audio codec level
Implement the signaling and enable flexibility In this manner, system 750 of FIG. 14 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

FIG. 15 illustrates an example system 500 including pre-selection unit 514, NGA audio decoder 520, and user interface 516. NGA audio decoder 520 includes NGA processor 522 and audio decoding & rendering units 524. In the example of FIG. 15, NGA audio decoder 520 and pre-selection unit 514 receive audio stream metadata 502 along with music and effects (M&E) media stream 504. Audio stream metadata 502 may be included in, for example, a manifest file, such as an MPD of DASH. In this example, each audio object is provided in a single, distinct stream. Thus, each of M&E stream 504, English dialogue stream 506, German dialogue stream 508, English commentary stream 510, and German commentary stream 512 is provided in a distinct stream. NGA audio decoder 520, in this example, determines which of the streams to retrieve based on input 528 received via user interface 516. Pre-selection unit 514 determines which of the streams includes the requested audio data (e.g., languages for dialogue, and if desired, languages for commentary) based on feedback provided by NGA audio decoder 520, which processes user selection 528 received via user interface 516. In particular, NGA processor 522 processes user selection 528, forwards selected audio streams from received audio data 526 to audio decoding & rendering units 524, and audio decoding & rendering units 524 decode and render audio data of the selected audio streams.

In this manner, system 500 of FIG. 15 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

FIG. 16 illustrates an example system 530 including pre-selection unit 544, NGA audio decoder 550, and user interface 546. NGA audio decoder 550 includes NGA processor 552 and audio decoding & rendering units 554. In the example of FIG. 16, NGA audio decoder 550 and pre-selection unit 544 receive audio stream metadata 532 along with music and effects (M&E) media stream 534. Audio stream metadata 532 may be included in, for example, a manifest file, such as an MPD of DASH.

In the example of FIG. 16, multiple objects may be provided in a single stream. In particular, in this example, M&E stream 534 and English dialogue 536 are provided in a single media stream 535, and the other audio objects are provided in single, respective streams. That is, German dialogue stream 538, English commentary stream 540, and German commentary stream 542 are provided in distinct streams, in this example. However, any of the other audio objects may be combined into a single stream. For example, a single stream may include both German dialogue stream 538 and German commentary stream 542.

NGA audio decoder 550, in this example, determines which of the streams to retrieve based on input 558 received via user interface 546. Pre-selection unit 544 determines which of the streams includes the requested audio data (e.g., languages for dialogue, and if desired, languages for commentary) based on feedback provided by NGA audio decoder 550, which processes user selection 558 received via user interface 546. In particular, NGA processor 552 processes user selection 558, forwards selected audio streams from received audio data 556 to audio decoding & rendering units 554, and audio decoding & rendering units 554 decode and render audio data of the selected audio streams.

In this manner, system 530 of FIG. 6 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

FIG. 17 illustrates an example system 560 including pre-selection unit 574, NGA audio decoder 580, and user interface 576. NGA audio decoder 580 includes NGA processor 582 and audio decoding & rendering units 584 In the example of FIG. 17, NGA audio decoder 580 and pre-selection unit 574 receive audio stream metadata 562 along with music and effects (M&E) media stream 564. Audio stream metadata 562 may be included in, for example, a manifest file, such as an MPD of DASH.

In the example of FIG. 17, each audio object is provided in a single stream, namely media stream 565. In particular, in this example, M&E stream 564, English dialogue stream 566, German dialogue stream 568, English commentary stream 570, and German commentary stream 572 are provided in media stream 565.

NGA audio decoder 580, in this example, determines which of the streams to retrieve based on input 588 received via user interface 576. Pre-selection unit 574 determines which of the streams includes the requested audio data (e.g., languages for dialogue, and if desired, languages for commentary) based on feedback provided by NGA audio decoder 580, which processes user selection 588 received via user interface 576. In particular, NGA processor 582 processes user selection 588, forwards selected audio streams from received audio data 586 to audio decoding & rendering units 584 and audio decoding & rendering units 584 decode and render audio data of the selected audio streams.

In this manner, system 560 of FIG. 17 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Although illustrated separately, a single receiver may be configured to receive audio data conforming to the models of any of FIGS. 15-17, alone or in any combination. Furthermore, although not shown in the examples of FIGS. 15-17, any of the example systems of FIGS. 15-17 may further include a Systems layer unit, configured in a manner that is substantially similar to the Systems layer units of FIG. 5-7, 9, 10, 13, or 14.

A receiver device according to the examples of FIGS. 15-17 may be configured to operate as follows. A Systems layer unit may determine network capabilities & delivery network of each media stream, decoder capabilities, and basic Systems layer metadata (e.g., language, accessibility, rating).

Figure 18:
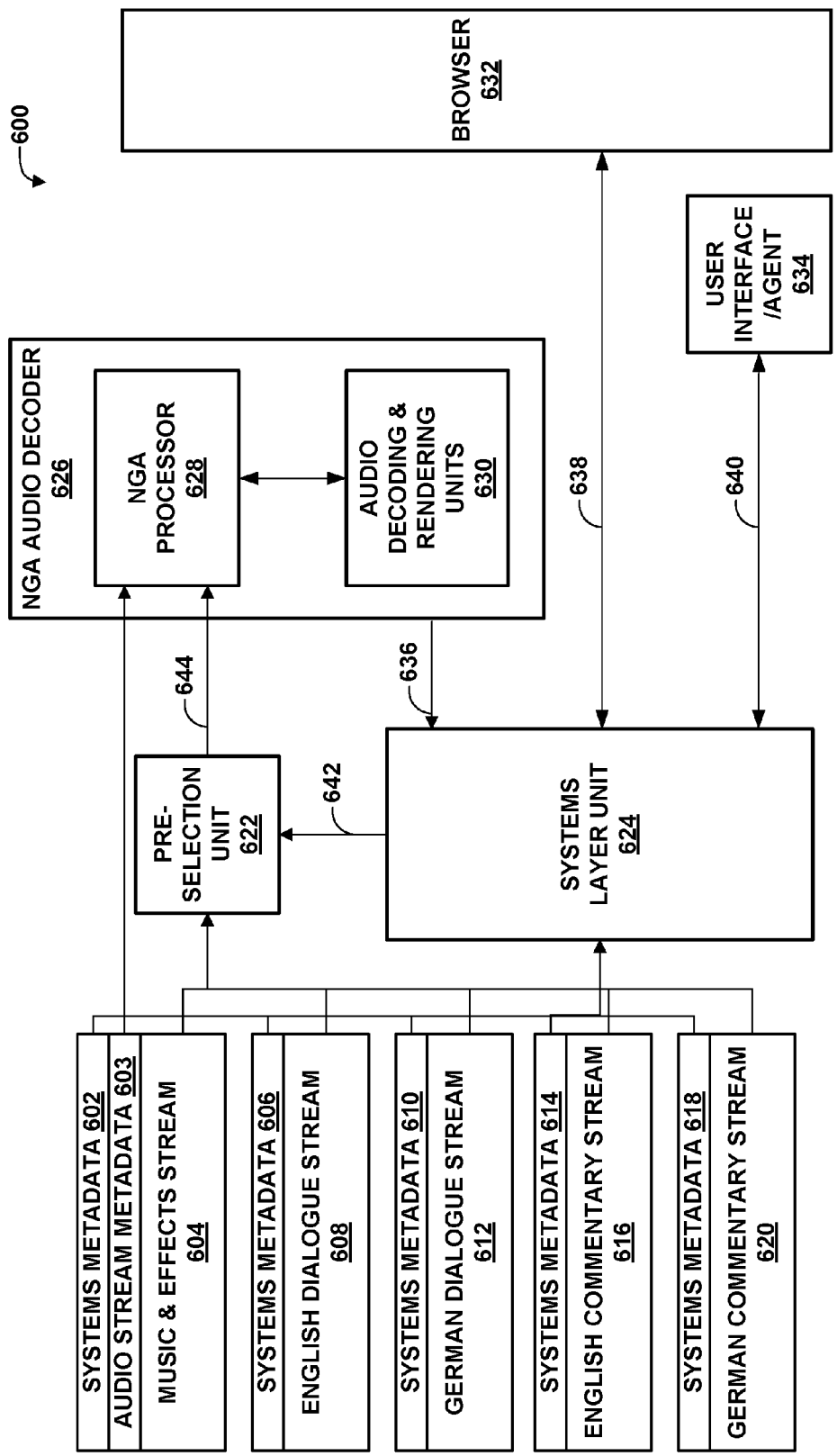
FIG. 18 is a conceptual diagram illustrating an example of a receiver device including a user interface positioned between a web browser and an MPEG-2 Systems layer.

NGA Selector may determine:
  Metadata assigned to each media stream
  Metadata may be much richer than what is defined on system level today
System Layer using System Metadata may:
  Prune media streams and pre-selections based on network capabilities, decoding capabilities and basic system metadata
  Offer all streams of one pre-selection to the audio decoder that are available based on network capabilities and system metadata
Audio decoder may inform system layer based on Audio Metadata on what streams (not) needed
  System Layer (de)selects streams accordingly to this information
The selection may be dynamic FIG. 18 is a conceptual diagram illustrating an example of a receiver device 600 including a user interface/agent 634 positioned between a web browser 632 and an MPEG-2 Systems layer unit 624. Receiver device 600 also includes selection unit 622 and NGA audio decoder 626, which in turn includes NGA processor 628 and audio decoding & rendering units 630.

Initially, NGA processor 628 may receive audio stream metadata 603, which includes data describing each available stream of media data, including music & effects (M&E) stream 604 (with accompanying Systems metadata 602), English dialogue stream 608 (with accompanying Systems metadata 606), German dialogue stream 612 (with accompanying Systems metadata 610), English commentary stream 616 (with accompanying Systems metadata 614), and German commentary stream 620 (with accompanying Systems metadata 618). Audio stream metadata 603 may be included in, for example, a manifest file, such as an MPD of DASH. Moreover, NGA audio decoder 626 provides data 636 to Systems layer unit 624, which represents available streams that can be processed, e.g., by audio decoding & rendering units 630. Systems layer unit 624 receives Systems metadata 602, 606, 610, 614, and 618, in this example, and sends data to web browser 632 representing which of the streams are available for selection.

In this example, a user may provide input via web browser 632 representing selected audio streams. Additionally or alternatively, the user may provide input via user interface/agent 634. In these examples, web browser 632 passes data 638 representing the user's selection, and/or user interface/agent 634 passes data 640 representing a selection. Systems layer unit 624 receives data 638 and/or 640, and in turn, provides data 642 representing the selection to pre-selection unit 622.

Pre-selection unit 622 determines which of the streams include the requested audio data (e.g., dialogue and/or commentary) from audio stream metadata 603 provided with M&E stream 604, and selects the appropriate streams. Pre-selection unit 622 then forwards audio data 644 from the selected streams to NGA audio decoder 626. NGA audio decoder 626 decodes and renders the audio data using audio decoding & rendering units 630, and then forwards the decoded and rendered audio data to an audio output, such as one or more speakers (not shown).

In this manner, receiver device 600 of FIG. 18 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Figure 19:
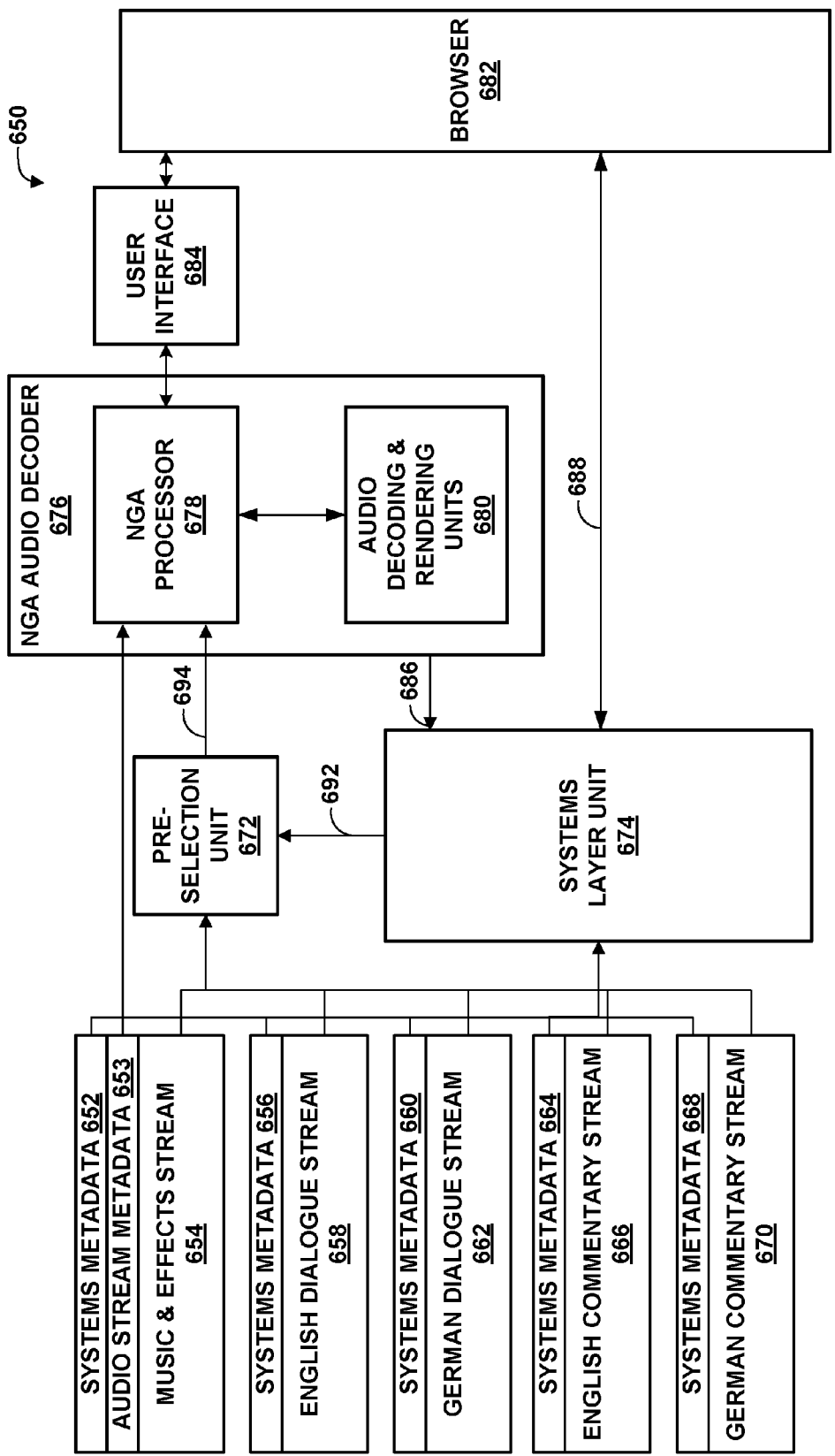
FIG. 19 is a conceptual diagram illustrating another example of a receiver device including a user interface positioned between a web browser and an NGA audio decoder.

FIG. 19 is a conceptual diagram illustrating another example of a receiver device 650 including user interface 684 positioned between web browser 682 and NGA audio decoder 676. This example conforms substantially to the example of FIG. 18, except that user interface 684 provides input from a user representing a selection of available audio streams to NGA audio decoder 676, and NGA audio decoder 676 provides data 686 representative of the input/selection to Systems layer unit 674. MPEG-2 Systems layer unit 674 in turn provides data 692 to pre-selection unit 672. Pre-selection unit 672 determines which of the available audio streams include requested audio data (e.g., dialogue and/or commentary) from audio stream metadata 653 provided with M&E stream 654. Audio stream metadata 653 may be included in, for example, a manifest file, such as an MPD of DASH.

In this example, the available audio data includes M&E stream 654 (with accompanying Systems metadata 652), English dialogue stream 658 (with accompanying Systems metadata 656), German dialogue stream 662 (with accompanying Systems metadata 660), English commentary stream 666 (with accompanying Systems metadata 664), and German commentary stream 670 (with accompanying Systems metadata 668). Systems layer unit 624 receives Systems metadata 652, 656, 660, 664, and 668, in this example, and sends data 688 to web browser 682 representing types of streams that are available for selection.

Pre-selection unit 672 determines which of the streams include the requested audio data (e.g., dialogue and/or commentary) from audio stream metadata 653 provided with M&E stream 654, and selects the appropriate streams. Pre-selection unit 672 then forwards audio data 694 from the selected streams to NGA audio decoder 676. NGA audio decoder 676 decodes and renders the audio data using audio decoding & rendering units 680, and then forwards the decoded and rendered audio data to an audio output, such as one or more speakers (not shown).

In this manner, receiver device 650 of FIG. 19 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Figure 20:
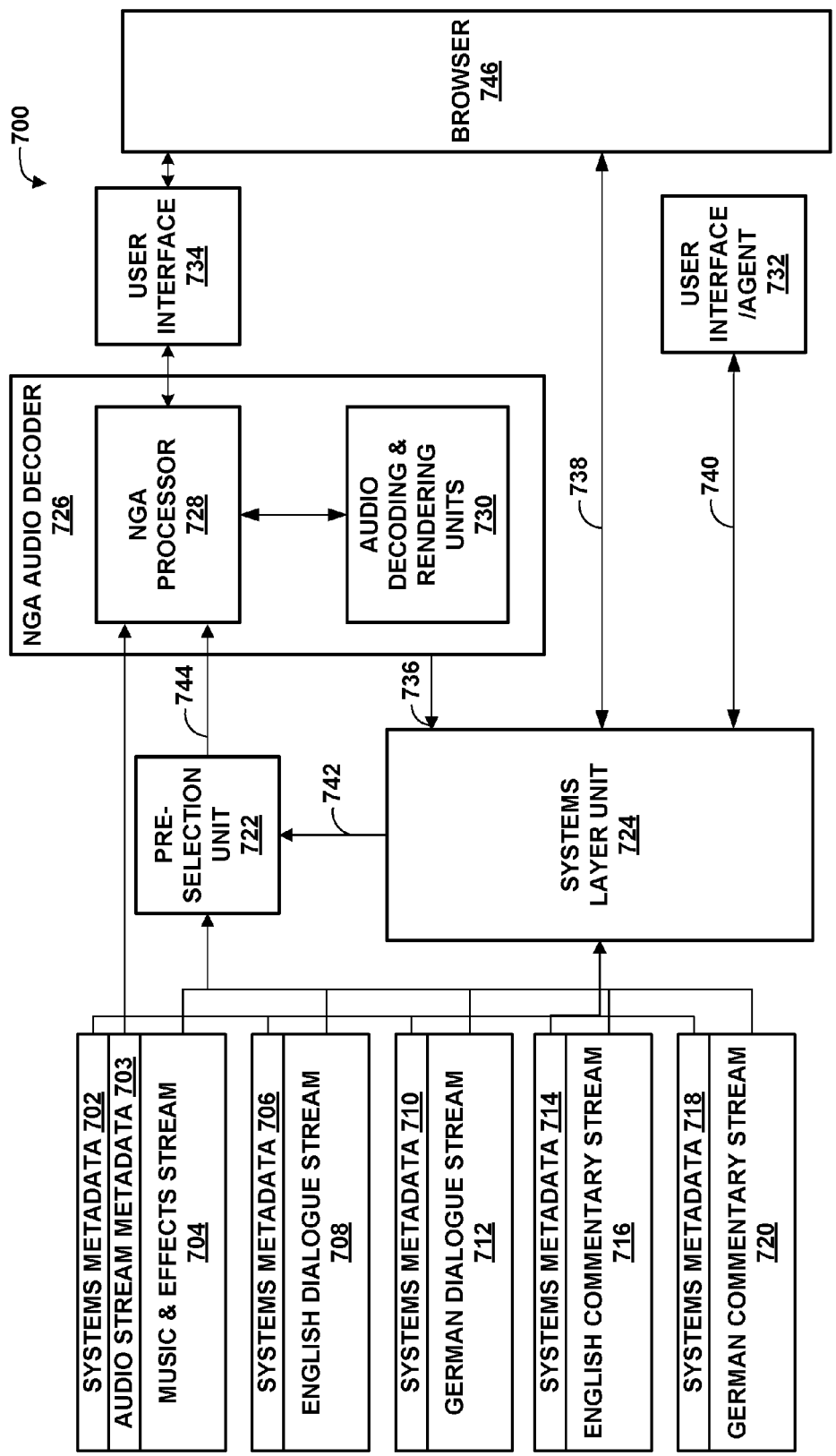
FIG. 20 is a conceptual diagram illustrating another example of a receiver device.

FIG. 20 is a conceptual diagram illustrating another example of a receiver device 700. This example represents a combination of the examples of FIGS. 18 and 19. That is, receiver device 700 may be configured to function according to either or both of the examples of receiver device 600 of FIG. 18 and/or receiver device 650 of FIG. 19.

In this example, receiver device 700 includes pre-selection unit 722, Systems layer unit 724, NGA audio decoder 726, user interface 734, user interface/agent 732, and browser 746. NGA audio decoder 726 includes NGA processor 728 and audio decoding & rendering units 730.

In this example, user interface 734 may provide input from a user representing a selection of available audio streams to NGA audio decoder 726. In this example, NGA audio decoder 726 provides data 736 representative of the input/selection to Systems layer unit 724. Alternatively, user interface/agent 732 and/or browser 746 may provide data 740, 738, respectively, to Systems layer unit 724 representing a selection of available audio streams to NGA audio decoder 726. In either case, MPEG-2 Systems layer unit 724 provides data 742 to pre-selection unit 722. Pre-selection unit 722 determines which of the available audio streams include requested audio data (e.g., dialogue and/or commentary) from audio stream metadata 703 provided with M&E stream 704. Audio stream metadata 703 may be included in, for example, a manifest file, such as an MPD of DASH.

In this example, the available audio data includes M&E stream 704 (with accompanying Systems metadata 702), English dialogue stream 708 (with accompanying Systems metadata 706), German dialogue stream 712 (with accompanying Systems metadata 710), English commentary stream 716 (with accompanying Systems metadata 714), and German commentary stream 720 (with accompanying Systems metadata 718). Systems layer unit 724 receives Systems metadata 702, 706, 710, 714, and 718, in this example, and sends data to web browser 746 representing types of streams that are available for selection.

Pre-selection unit 722 determines which of the streams include the requested audio data (e.g., dialogue and/or commentary) from audio stream metadata 703 provided with M&E stream 704, and selects the appropriate streams. Pre-selection unit 722 then forwards audio data 744 from the selected streams to NGA audio decoder 726. NGA audio decoder 726 decodes and renders the audio data using audio decoding & rendering units 730, and then forwards the decoded and rendered audio data to an audio output, such as one or more speakers (not shown).

In this manner, receiver device 700 of FIG. 20 represents an example of a device for receiving audio data includes an audio decoder implemented using digital logic circuitry and configured to decode audio data conforming to MPEG-H or AC-4 part 2, and an audio data processing unit implemented in digital logic circuitry and configured to receive a manifest file describing a plurality of audio objects conforming to MPEG-H or AC-4 part 2, wherein the manifest file indicates whether each of the audio objects is available via broadcast, broadband, or both broadcast and broadband, receive selection data indicating which of the audio objects are to be presented, receive streamed media data including the audio objects based on the selection data, and provide the audio objects indicated by the selection data to the audio decoder.

Data that may be used for pre-selection of audio data (and, therefore, audio streams) may include the following, as one example:

Essential pre-selection data enabling Systems layer to preselect:
@codecs
Only 2: AC-4 and MPEG-H audio
Network capabilities (broadcast only, broadband)
Possible Pre-Selection Data:
Role and Accessibility
Covered with Role Scheme from Amd.2.
Language
Based on possible value of ISO/IEC language tag.
Audio Channel Configuration
Codec Independent code points: ISO/IEC 23001-9
Channel Positions
Codec Independent code points: ISO/IEC 23001-9
Sampling Rate
May have an integer value
Rating
Any scheme available in ATSC.
Any others that need to be defined carefully.
If pre-selection is enabled at the MPEG-2 Systems level, certain streams may not be available to the audio decoder.

Devices and systems in accordance with this disclosure, such as those shown in the figures discussed above, may operate according to the following general requirements and solution:

Signal that potentially a single Adaptation Set cannot be used→define a type PartialAS.
Signal that all Adaptation Sets belong to a single decoder→@bundleID.
Provide the signaling of pre-selections:
Option 1: Pre-Selection element that references streams provided in Partial AS.
Option 2: linear dependency of a stream using a new dependency element.
In all cases, the pre-selections may be annotated with the metadata. The pre-selection elements may include parameters that can be used for automatic selection, e.g., by a user agent.
Annotate the main stream of the bundle.
Option 1: add @main signaling.
Option 2: first stream of the @sequence attribute.
Annotate objects that are in one stream→ContentComponent.
Annotate all Partial Adaptation Set such that it can be referred to by the audio decoder43 @memberID.

Devices and systems in accordance with this disclosure, such as those shown in the figures discussed above, may operate according to the following ATSC caveats:

Expected that there is always a complete presentation distributed through broadcast→make it a full Adaptation Set which can be selected and also contains the complete audio metadata.

Describe additional media streams through Adaptation Sets that cannot be individually selected.

Enable multiplexed versions as well as separate versions→Add Component ID.

The following is one example proposal of a solution for ATSC, which may be implemented by any of the devices or systems of this disclosure, or similar devices or systems:

Always provide exactly one complete Adaptation Set, typically delivered over broadcast.

Provide associated Partial Adaptation Sets for additional objects typically provided over broadband.

Partial Adaptation Sets may be signaled with an Essential Descriptor and a new scheme.

The value of the Descriptor may provide a sequence of Adaptation Set IDs operation with the starting point the corresponding complete Adaptation Set.

Signal each object as ContentComponent:

The description may be provided using the existing parameters for each object. If only a single Content Component is included, then this may be signaled on AS level.

The value of the ContentComponent@id is owned by the codec and may be used to identify the object, for example, if the information is forwarded.

Provide @qualityRanking to enable matching Representations in different Adaptation Sets.

In addition, a new ex:PreSelection extension element may be provided signaling Pre-Selections.

The pre-selections may provide a combination of multiple objects (provided by pointing to the ContentComponent@id) and assign a signal Pre-Selection ID.

Additional metadata in the pre-selection element may even be codec-specific.

An example mapping to functions is provided below:

Signal that potentially a single Adaptation Set cannot be used→define a type PartialAS→Essential Descriptor, but always one complete Pre-Selection in one AS.

Signal that all Adaptation Sets belong to a single decoder→@bundleID→bundle ID is the @id of the main Adaptation Set and all ASs signal in their Essential Descriptor value that they belong to this AS.

Provide the signaling of pre-selections:

Option 1: Pre-selection element that references streams provided in Partial AS→this may be used for information.

Option 2: linear dependency of a stream using a new dependency element→this may be used at the ContentComponent level.

In all cases the pre-selections may be annotated with the metadata.

Annotate the main stream of the bundle:

Option 1: add @main signaling to represent one complete Adaptation Set.

Option 2: first stream of the @sequence attribute to represent one complete Adaptation Set.

Annotate objects that are in one stream→ContentComponent→same.

Annotate all Partial Adaptation Set such that it can be referred to by the audio decoder→@memberID→ContentComponent@id.

An example set of data according to the techniques discussed above is:

Main Audio Stream contains M&E objects as well as English dialogue.

In addition, the following is available in the examples discussed above (although in other examples, other sets of audio data in other languages may be available):

German dialogue

English commentary

German commentary

In the examples of FIGS. 5-20, the various devices and units thereof may be implemented in hardware, software, firmware, or any combination thereof. When implemented in software or firmware, it should be understood that requisite hardware may also be provided. Such hardware may include any of a variety of programmable and/or fixed purpose processing units implemented in discrete logic circuitry, such as, for example, one or more digital signal processors (DSPs), general purpose microprocessors, application specific integrated circuits (ASICs), field programmable logic arrays (FPGAs), or other equivalent integrated or discrete logic circuitry.

Furthermore, in the examples of FIGS. 5-20, the various audio streams may conform to, for example, MPEG-H or AC-4 part 2, or other such audio coding standards. Transmission standards for transmitting the audio streams include MPEG-2 Transport Streams (TS), such that each audio stream may be carried in a single program stream, a separate respective program stream, or an N:M relationship between audio streams and program streams in which one or more audio streams may be carried in a single MPEG-2 TS program stream and in which there may be multiple MPEG-2 TS program streams (each carrying one or more audio streams). Additionally or alternatively, the audio streams may be included as MPEG Media Transport (MMT) assets comprising audio objects.

Figure 21:
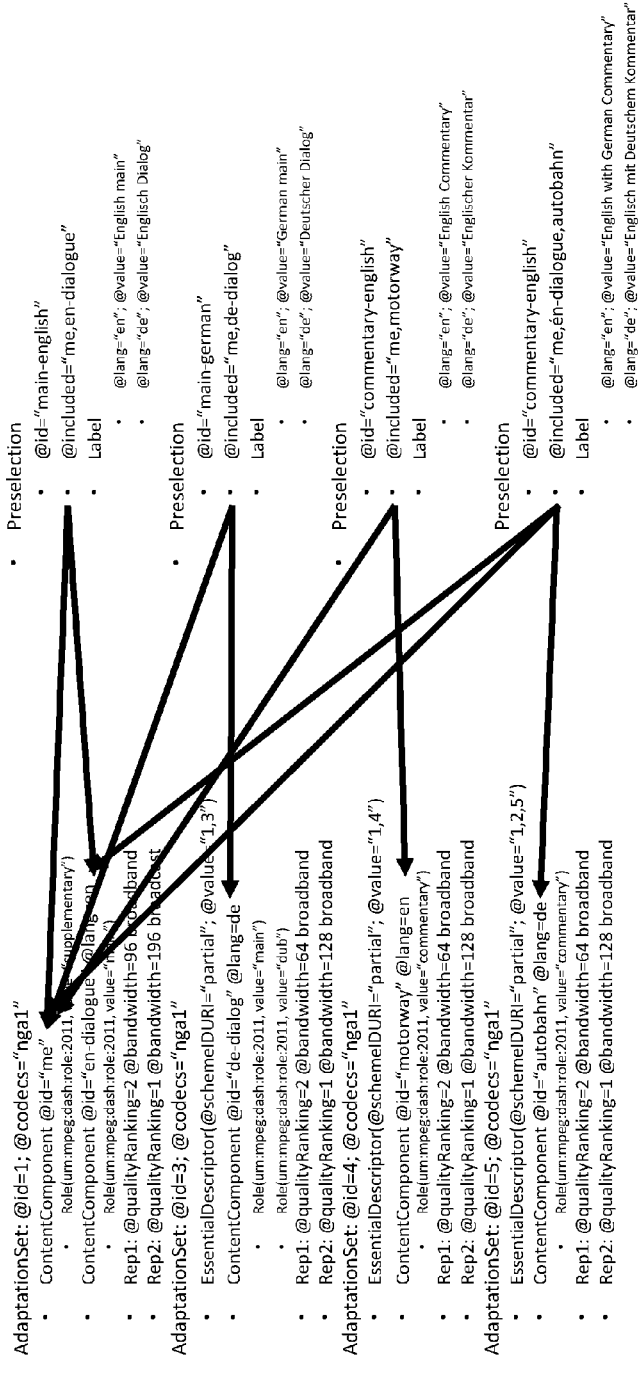
FIG. 21 is a conceptual diagram illustrating an example selection of all data made on the MPEG-2 Systems level.

FIG. 21 is a conceptual diagram illustrating an example selection of all data made on the MPEG-2 Systems level. Arrows represent correspondence between pre-selected audio data to streams including the selected data. The correspondence may be determined by the pre-selection unit as discussed above in various examples.

Figure 22:
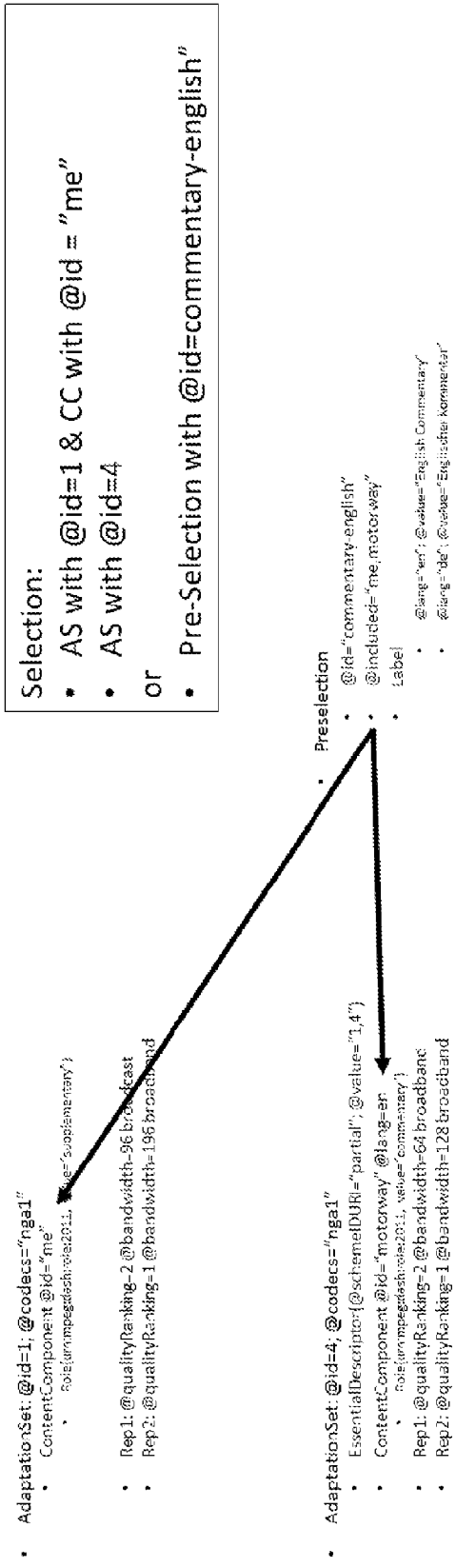
FIG. 22 is a conceptual diagram illustrating an example in which there is a selection of English language commentary in addition to M&E audio data.

FIG. 22 is a conceptual diagram illustrating an example in which there is a selection of English language commentary in addition to M&E audio data. The selection of the English language commentary may be made either by identifying the stream using the @id=4 attribute of the Adaptation Set including the English language commentary, or via pre-selection using the @id="commentary-english" attribute. FIG. 22 particularly illustrates what remains following pruning of Adaptation Sets that do not match the pre-selected or selected attributes from the data set shown in FIG. 21.

Figure 23:
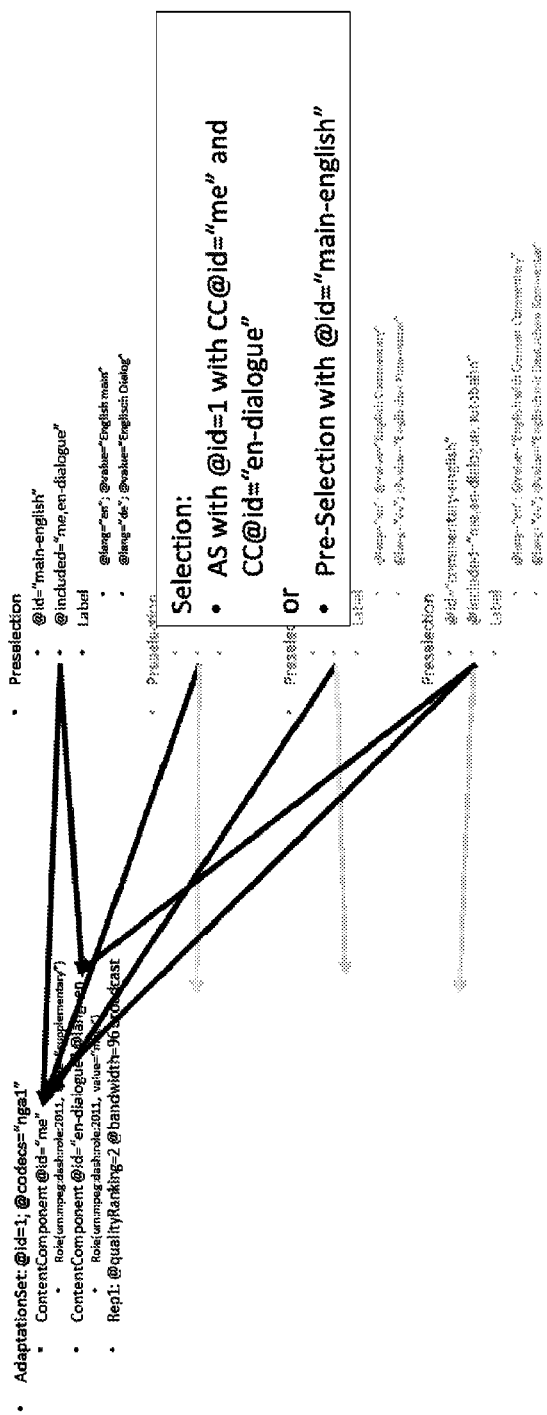
FIG. 23 is a conceptual diagram illustrating another example in which the pre-selection unit (or another unit) prunes adaptation sets to remove those that are not selected by a user.

FIG. 23 is a conceptual diagram illustrating another example in which the pre-selection unit (or another unit) prunes adaptation sets to remove those that are not selected by a user. In this case, a pre-selection is made for the M&E stream and the English dialogue stream. The pre-selection unit may then prune all other streams, i.e., those that do not have an @id element equal to "1", ContentComponent @id="me", ContentComponent @id="en-dialogue," and/or @id="main-english." FIG. 23 particularly illustrates what remains following pruning of Adaptation Sets that do not match the pre-selected or selected attributes from the data set shown in FIG. 21.

Alternatively, pre-selections may be used for selection. When using pre-selections for selection, the following data may be used, in this order:
- @codecs including codecs, profile and level indications, for example the required total number of objects that need to be decoded
- Rating restrictions of the pre-selection
- Other capabilities
- Label, for user interaction based selection
- Labels may be available in different languages for presentation
- The only present or dominant (could be either) language of the pre-selection @lang
- The assigned Role of the pre-selection according to existing definitions
- Other parameters that are also assigned to audio
- @priority (selection if multiple stay)
- @bundleID (decoder instance signaling)

An example pruning process performed by, e.g., the pre-selection unit described above may be as follows:
- Initially prune pre-selections on capabilities (e.g., coding and rendering capabilities). If specified in pre-selection element and available on platform, typically:
  - Codec profile/level,
  - Rating restrictions, and/or
  - Other audio capabilities, e.g., rendering.
- If possible, use Label to do user selection (likely not at join time)
- Use system defaults to further prune pre-selections (language, role, etc.)
- Finally use priority to select the remaining pre-selection with the highest priority.

The following is an example of a more complex use case.
Streams:
- Stream A=(2 muxed audio components)=M&E+Dialogue primary language (EN)
- Stream B=Dialogue secondary language (DE)
- Stream C=Commentary (EN)
- Stream D=Commentary (DE)

Pre-Selection:
- Option 1=M&E+Dialogue (EN)
- Option 2=M&E+Dialogue (DE)
- Option 3=M&E+Dialogue (EN)+Commentary (EN)
- Option 4=M&E+Dialogue (DE)+Commentary (DE)
- Option 5=M&E+Dialogue (DE)+Commentary (EN)
- Option 6=M&E+Commentary (EN)

Assumptions:
- 2 components decoded together require @codecs="nga1.level1"
- 3 components decoded together require @codecs="nga1.level2"

In some examples, the same content may be identified in the manifest file (e.g., the MPD) multiple times. The following shows such an example:

AdaptationSet: @id=1; @codecs="nga1"
  ContentComponent @id="me"
    Role(urn:mpeg:dash:role:2011, value="supplementary")
  ContentComponent @id="en-dialogue" @lang=en
    Role(urn:mpeg:dash:role:2011, value="main")
  Rep1: @qualityRanking=2 @bandwidth=96 broadband
  Rep2: @qualityRanking=1 @bandwidth=196 broadcast
AdaptationSet: @id=2; @codecs="nga1"
  EssentialDescriptor(@schemeIDURI="partial"; @value="1,2")
  ContentComponent @id="de-dialog" @lang=de
    Role(urn:mpeg:dash:role:2011, value="main")
    Role(urn:mpeg:dash:role:2011, value="dub")
  Rep1: @qualityRanking=2 @bandwidth=64 broadband
  Rep2: @qualityRanking=1 @bandwidth=128 broadband
AdaptationSet: @id=3; @codecs="nga2"
  EssentialDescriptor(@schemeIDURI="partial"; @value="1,3")
  ContentComponent @id="motorway" @lang=en
    Role(urn:mpeg:dash:role:2011, value="commentary")
  Rep1: @qualityRanking=2 @bandwidth=64 broadband
  Rep2: @qualityRanking=1 @bandwidth=128 broadband
AdaptationSet: @id=4; @codecs="nga2"
  EssentialDescriptor(@schemeIDURI="partial"; @value="1,2,4")
  ContentComponent @id="autobahn" @lang=de
    Role(urn:mpeg:dash:role:2011, value="commentary")
  Rep1: @qualityRanking=2 @bandwidth=64 broadband
  Rep2: @qualityRanking=1 @bandwidth=128 broadband
AdaptationSet: @id=5; @codecs="nga2"
  EssentialDescriptor(@schemeIDURI="partial"; @value="1,2,5")
  ContentComponent @id="motorway" @lang=en
    Role(urn:mpeg:dash:role:2011, value="commentary")
  Rep1: @qualityRanking=2 @bandwidth=64 broadband
  Rep2: @qualityRanking=1 @bandwidth=128 broadband
AdaptationSet: @id=6; @codecs="nga1"
  EssentialDescriptor(@schemeIDURI="partial"; @value="1,6")
  ContentComponent @id="motorway" @lang=en
    Role(urn:mpeg:dash:role:2011, value="commentary")
  Rep1: @qualityRanking=2 @bandwidth=64 broadband
  Rep2: @qualityRanking=1 @bandwidth=128 broadband Examples of pre-selections in accordance with this manifest file data may be as follows:
Preselection
  @id="option 1"
  @included="me,en-dialogue"
  Label
    @lang="en"; @value="English main"
    @lang="de"; @value="Englisch Dialog"
Preselection
  @id="option 2"
  @included="me,de-dialog"
  Label
    @lang="en"; @value="German main"
    @lang="de"; @value="Deutscher Dialog"
Preselection
  @id="option 3"
  @included="me,en-dialogue,motorway"
  Label
    @lang="en"; @value="English Commentary"
    @lang="de"; @value="Englischer Kommentar"

Preselection
  @id="option 4"
  @included="me,de-dialog,autobahn"
  Label
    @lang="en"; @value="English with German Commentary"
    @lang="de"; @value="Englisch mit Deutschem Kommentar"
Preselection
  @id="option 5"
  @included="me,de-dialog,motorway"
  Label
    @lang="en"; @value="English with German Commentary"
    @lang="de"; @value="Englisch mit Deutschem Kommentar"
Preselection
  @id="option 6"
  @included="me,motorway"
  Label
    @lang="en"; @value="English with German Commentary"
    @lang="de"; @value="Englisch mit Deutschem Kommentar"

In another example, pre-selection may be based on selection, as shown below:
  AdaptationSet: @id=1; @codecs="nga1"
    ContentComponent @id="me"
      Role(urn:mpeg:dash:role:2011, value="supplementary")
    ContentComponent @id="en-dialogue" @lang=en
      Role(urn:mpeg:dash:role:2011, value="main")
      Rep1: @qualityRanking=2 @bandwidth=96 broadband
      Rep2: @qualityRanking=1 @bandwidth=196 broadcast
  AdaptationSet: @id=3; @codecs="nga2"
    EssentialDescriptor(@schemeIDURI="partial"; @value="1,3")
    ContentComponent @id="de-dialog" @lang=de
      Role(urn:mpeg:dash:role:2011, value="main")
      Role(urn:mpeg:dash:role:2011, value="dub")
      Rep1: @qualityRanking=2 @bandwidth=64 broadband
      Rep2: @qualityRanking=1 @bandwidth=128 broadband
  AdaptationSet: @id=4; @codecs="nga2"
    EssentialDescriptor(@schemeIDURI="partial"; @value="1,4")
    ContentComponent @id="motorway" @lang=en
      Role(urn:mpeg:dash:role:2011, value="commentary")
      Rep1: @qualityRanking=2 @bandwidth=64 broadband
      Rep2: @qualityRanking=1 @bandwidth=128 broadband
  AdaptationSet: @id=5; @codecs="nga2"
    EssentialDescriptor(@schemeIDURI="partial"; @value="1,5")
    ContentComponent @id="autobahn" @lang=de
      Role(urn:mpeg:dash:role:2011, value="commentary")
      Rep1: @qualityRanking=2 @bandwidth=64 broadband
      Rep2: @qualityRanking=1 @bandwidth=128 broadband Examples of pre-selections in accordance with this manifest file data may be as follows:
  Preselection
    @id="option 1". @included="me,en-dialogue"; @codecs=nga1; @priority=1
    Label
      @lang="en"; @value="English main"
      @lang="de"; @value="Englisch Dialog"
  Preselection
    @id="option 2", @included="me,de-dialog"; @codecs=nga1; @priority=2
    Label
      @lang="en"; @value="German main"
      @lang="de"; @value="Deutscher Dialog"
  Preselection
    @id="option 3", @included="me,en-dialogue,motorway"; @codecs=nga2; @priority=3
    Label
      @lang="en"; @value="English Dialogue and Commentary"
      @lang="de"; @value="Englischer Dialog mit Kommentar"
  Preselection
    @id="option 4", @included="me,de-dialog,autobahn"; @codecs=nga2; @priority=4
    Label
      @lang="en"; @value="German with German Commentary"
      @lang="de"; @value="Deutsch mit Deutschem Kommentar"
  Preselection
    @id="option 5", @included="me,de-dialog,motorway"; @codecs=nga2; @priority=5
    Label
      @lang="en"; @value="German with English Commentary"
      @lang="de"; @value="Deutsch mit Englischem Kommentar"
  Preselection
    @id="option 6". @included="me,motorway"; @codecs=nga1; @priority=6
    Label
      @lang="en"; @value="German Commentary"
      @lang="de"; @value="Deutscher Kommentar"

In the example above, if nga1 and "German" were selected, the remaining pre-selection option would be the preselection having @id="option2."

Examples of ATSC use cases are described below. Optional elements and attributes are shown in italics.

First, second, third, and fourth example ATSC use cases as described below generally involve a broadcaster that delivers a program with just one complete main audio stream. There are no other audio options available for this program in these examples.
  AdaptationSet: @id=1; @codecs="nga1"; @lang—en
    ContentComponent @id="complete"
    Role(urn:mpeg:dash:role:2011, value="main")
    Rep1: @bandwidth=196 broadcast
  Preselection
    @id="main-english"
    @included="complete"

The first, second, third, and fourth example ATSC use cases are as follows:
  A broadcaster delivers a program with just one complete main audio stream. There are no other audio options available for this program.

A broadcaster provides a program with two or more complete main audio streams via broadcast. Only one of the streams is chosen by the client, based on today's audio property signaling available in DASH manifests, according to, e.g.:
the audio language preference setting of the receiver,
the accessibility settings of the receiver,
the codec capabilities of the receiver, and/or
the output preference of the receiver (e.g., stereo vs. multichannel output).

A broadcaster delivers a program offering multiple audio options to the viewer, in other forms than individual complete main audio streams. That is, the broadcaster may provide one single audio stream that contains all required audio components to decode, e.g., primary language, secondary languages, video description services, etc. Only one of the audio options from the stream is chosen by the client, based on:
today's audio property signaling available in DASH manifests, and/or
new parameters or methods to be defined by DASH-IF in order to signal immersive and personalized content.

A broadcaster provides hybrid service, a program with 2 audio options. One main audio stream may be delivered via broadcast and another main audio stream may be delivered via broadband. Only one of the streams is chosen by the client, based on:
today's audio property signaling available in DASH manifests,
new parameters or methods to be defined by DASH-IF in order to signal immersive and personalized content, and/or
connectivity (enabled/disabled access to hybrid content via Ethernet or WiFi).

Fifth, sixth, and seventh example ATSC use cases involve a broadcaster that provides a program with two or more complete main audio streams via broadcast. Only one of the streams is chosen by the client, based on today's audio property signaling available in DASH manifests, according to, e.g., the audio language preference setting of the receiver, the accessibility settings of the receiver, the codec capabilities of the receiver, and the output preference of the receiver (e.g., stereo vs. multichannel output).
AdaptationSet: @id=1; @codecs="nga1"; @lang=en
  ContentComponent @id="complete"
  Role(urn:mpeg:dash:role:2011, value="main")
  Rep1: @bandwidth=196 broadcast
AdaptationSet: @id=2; @codecs="nga1"; @lang=de
  ContentComponent @id="complete"
  Role(urn:mpeg:dash:role:2011, value="dub")
  Rep1: @bandwidth=196 broadcast
Preselection
  @id="main-english"
  @bundleID=1
  @included="complete"
Preselection
  @id="main-german"
  @bundleID=2
  @included="complete"

The fifth, sixth, and seventh example ATSC use cases, which may use the data discussed above, are as follows:
A broadcaster provides a hybrid service. A program with many audio options, where the common audio component (e.g., Music and Effects) and the primary language audio are delivered via broadcast. Secondary languages and other audio components are delivered via broadband. All audio options require that the common component is decoded in conjunction. Only one of the audio options is chosen by the client, based on:
today's audio property signaling available in DASH manifests
new parameters or methods to be defined by DASH-IF in order to signal immersive and personalized content
connectivity (enabled/disabled access to hybrid content via Ethernet or WiFi)

A broadcaster provides a program with many audio options, where all audio components are delivered via broadband. Only one of the audio options is chosen by the client, based on:
today's audio property signaling available in DASH manifests
new parameters or methods to be defined by DASH-IF in order to signal immersive and personalized content
Additional audio streams delivered via broadband.

Figure 24:
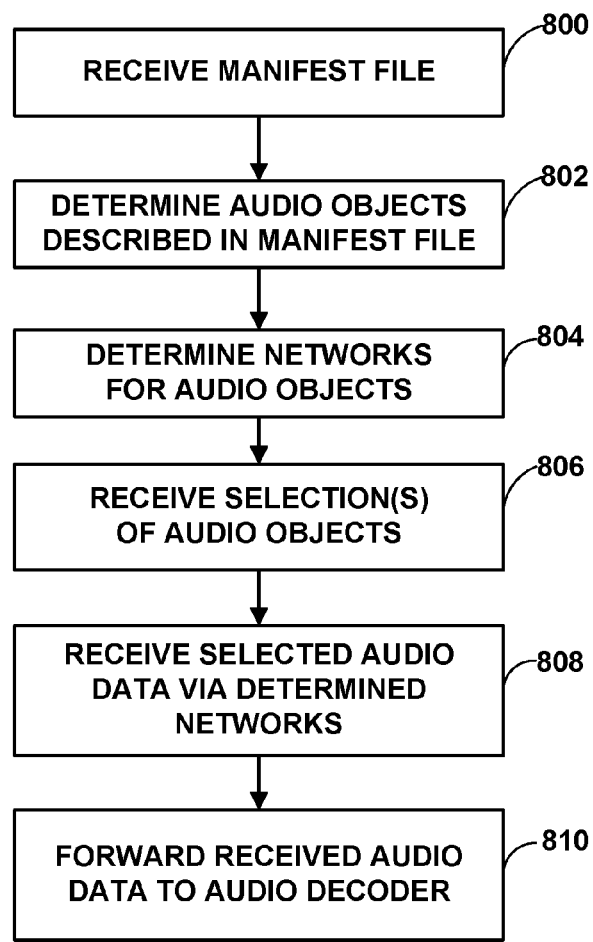
FIG. 24 is a flowchart illustrating an example method in accordance with techniques of this disclosure.

FIG. 24 is a flowchart illustrating an example method in accordance with techniques of this disclosure. For purposes of example, the example method is described as being performed by receiver device 700 of FIG. 20. However, it should be understood that this or a similar method could be performed by a variety of other devices, such as network receiver 600 of FIG. 18, network receiver 650 of FIG. 19, or the various receiver devices/systems of any of FIG. 6, 7, 9, 10, or 13-17.

Initially, in this example, NGA audio decoder 726 receives a manifest file for media data (800). The manifest file may comprise, for example, an MPD of DASH. The manifest file may include audio stream metadata, such as audio stream metadata 703 (FIG. 20). The audio stream metadata may generally describe characteristics of audio data of the media data, such as coding characteristics, rendering characteristics, and other characteristics such as a content rating (describing content suitability for particular audiences) for the corresponding streams, languages for the corresponding streams, and/or role/accessibility for the corresponding streams.

Accordingly, NGA audio decoder 726 may determine audio objects described in the manifest file (802). In general, the audio objects may correspond to adaptation sets or partial adaptation sets of the media data. Each audio object may represent a different type of audio data, such as music and effects, dialogue, and/or commentary. In the example of FIG. 20, NGA audio decoder 726 would determine that M&E stream 704, English dialogue stream 708, German dialogue stream 712, English commentary stream 716, and German commentary stream 720 are available.

NGA audio decoder 726 may further determine networks by which each of the streams are available (804). In particular, the various networks may represent manners in which the corresponding streams are transported via the networks, such as broadcast, broadband, or both. Moreover, although not shown in FIG. 24, NGA audio decoder 726 may also determine whether audio adaptation sets corresponding to the audio objects include respective fully presentable audio presentations having respective specific identifiers, whether an audio adaptation set depends on one or more other audio adaptation sets (as well as identifiers for the audio adaptation sets from which the audio adaptation set depends), and identifiers for the audio adaptation sets.

NGA audio decoder 726 may then receive one or more selections of audio objects (806). Such selections may represent user selections or user agent selections. A user selection typically represents live user input, whereas user agent selection typically represents previously configured configuration data (which may represent, e.g., "select English dialogue, if available"). As discussed above with respect to FIG. 20, NGA audio decoder 726 may receive such input from user interface/agent 732 (FIG. 20), browser 746 (FIG. 20), or user interface 734 (FIG. 20). In some examples, NGA audio decoder 726 may initially indicate, via browser 746, which of the audio streams is available, e.g., based on audio stream metadata 703 and based on which networks are currently available for receiver device 700.

After receiving selection data indicating which of the audio objects has been selected, NGA audio decoder 726 receives the selected audio data via the determined networks (808). For example, if a broadcast network is available, and one or more of the audio streams is available via the broadcast network, NGA audio decoder 726 may receive the audio data via the broadcast network. In some examples, receiving audio data via a broadcast network may include subscribing to the broadcast (or, in some examples, a network multicast). As another example, if the broadcast network is not available, or if a selected audio object is only available via broadband, NGA audio decoder 726 may receive the selected audio object via broadband, e.g., according to a unicast protocol, such as HTTP (e.g., using DASH). In response to receiving the audio data, NGA processor 728 of NGA audio decoder 726 forwards the audio data to an audio decoder (810), such as audio decoding & rendering units 730 (FIG. 20).

In this manner, the method of FIG. 24 represents an example of a method including receiving a manifest file describing a plurality of audio objects conforming to MPEG-H or AC-4 part 2, wherein the manifest file indicates whether each of the audio objects is available via broadcast, broadband, or both broadcast and broadband, receiving selection data indicating which of the audio objects are to be presented, receiving streamed media data including the audio objects based on the selection data, and providing the audio objects indicated by the selection data to an audio decoder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of receiving media data, the method comprising:
receiving a manifest file including audio stream metadata describing a plurality of audio objects conforming to MPEG-H or AC-4 part 2, wherein the manifest file indicates whether each of the audio objects is available via broadcast, broadband, or both broadcast and broadband;
providing the audio stream metadata to an audio decoder configured to decode audio data conforming to MPEG-H or AC-4 part 2;
receiving data representative of the plurality of audio objects from the audio decoder in response to providing the audio stream metadata to the audio decoder;
receiving selection data indicating which of the audio objects are to be presented;
receiving streamed media data including the audio objects based on the selection data, wherein receiving the streamed media data comprises:

determining which of the audio objects of the plurality audio objects are to be presented using the selection data;

determining, for each of the audio objects that are to be presented, whether the audio object is available via broadcast or broadband using the manifest file; and retrieving each of the audio objects that are to be presented via either broadcast or broadband based on the determination of whether the audio objects that are to be presented are available via broadcast or broadband and from network locations specified in the manifest file; and providing the audio objects indicated by the selection data to the audio decoder.

2. The method of claim 1, wherein the manifest file comprises a Dynamic Adaptive Streaming over HTTP (DASH) media presentation description (MPD), and wherein the audio objects are signaled as Adaptation Sets in the DASH MPD.

3. The method of claim 1, wherein receiving the streamed media data comprises receiving either a single program stream conforming to MPEG-2 Transport Streams (TS) or multiple program streams conforming to MPEG-2 TS.

4. The method of claim 1, wherein receiving the streamed media data comprises receiving one or more MPEG Media Transport (MMT) assets comprising the audio objects.

5. The method of claim 1, further comprising using the manifest file to determine, for each of the audio adaptation sets:

whether the audio adaptation sets comprise a fully presentable audio presentation having a specific identifier (ID);

whether the audio adaptation set depends on one or more other audio adaptation sets and, when the audio adaptation set depends on one or more other audio adaptation sets, identifiers for the one or more other audio adaptation sets; and an identifier for the audio adaptation set.

6. The method of claim 5, further comprising determining relative qualities of each representation in the audio adaptation sets representing quality ranking attributes for each of the representations.

7. The method of claim 5, wherein the manifest file indicates that each of the audio objects is provided in a distinct stream of data.

8. The method of claim 5, wherein the manifest file indicates that two or more of the audio objects are multiplexed in a broadcast stream and that the other audio objects are available as distinct streams of data via broadband.

9. The method of claim 5, wherein the manifest file indicates that each of the audio objects is multiplexed into a single stream of data.

10. The method of claim 9, wherein the manifest file indicates that the single stream of data is available via broadcast.

11. The method of claim 5, wherein the manifest file signals the specific ID of the fully presentable audio presentation as an audio object identifier of the audio object that comprises the fully presentable audio presentation.

12. The method of claim 5, wherein the manifest file signals the specific ID of the fully presentable audio presentation as a track ID of a track in an ISO Base Media File Format file that includes the fully presentable audio presentation.

13. The method of claim 5, wherein the manifest file signals the specific ID of the fully presentable audio presentation as a program identifier (PID) of an elementary stream in an MPEG-2 Transport Stream including the fully presentable audio presentation.

14. The method of claim 5, wherein the manifest file includes descriptor data signaling the specific ID of an MPEG Media Transport (MMT) stream including the fully presentable audio presentation.

15. The method of claim 5, wherein the manifest file signals dependencies between audio adaptation sets using an Essential Descriptor having a value providing identifiers for the adaptation sets on which a dependent adaptation set depends.

16. The method of claim 5, wherein the manifest file signals identifiers for the audio objects using Content Component elements.

17. The method of claim 5, further comprising retrieving one or more pre-selection elements from the manifest file.

18. The method of claim 17, wherein the pre-selection elements each include a descriptor for selecting a subset of the audio objects.

19. The method of claim 17, wherein the pre-selection elements each include one or more parameters that can be used for automatic selection.

20. The method of claim 17, wherein the pre-selection elements each include data that indicates required codec capabilities for this pre-selection.

21. The method of claim 17, wherein the pre-selection elements each include a text label for user selection.

22. The method of claim 21, wherein the text label is provided in a language corresponding to a language of the respective audio data.

23. The method of claim 17, wherein the pre-selection elements each include a priority value.

24. The method of claim 17, further comprising selecting a subset of the audio objects using the pre-selection elements based on the received selection data.

25. A device for receiving audio data, the device comprising:

an audio decoder implemented using digital logic circuitry and configured to decode audio data conforming to MPEG-H or AC-4 part 2; and an audio data processing unit implemented in digital logic circuitry and configured to:

receive a manifest file including audio stream metadata describing a plurality of audio objects conforming to MPEG-H or AC-4 part 2, wherein the manifest file indicates whether each of the audio objects is available via broadcast, broadband, or both broadcast and broadband;

provide the audio stream metadata to the audio decoder;

receive data representative of the plurality of audio objects from the audio decoder in response to providing the audio stream metadata to the audio decoder;

receive selection data indicating which of the audio objects are to be presented;

receive streamed media data including the audio objects based on the selection data, wherein to receive the streamed media data, the audio data processing unit is configured to:

determine which of the audio objects of the plurality audio objects are to be presented using the selection data;

determine, for each of the audio objects that are to be presented, whether the audio object is available via broadcast or broadband using the manifest file; and retrieve each of the audio objects that are to be presented via either broadcast or broadband based on the determination of whether the audio objects that are to be presented are available via broadcast or broadband and from network locations specified in the manifest file; and provide the audio objects indicated by the selection data to the audio decoder.

26. The device of claim 25, wherein the manifest file comprises a Dynamic Adaptive Streaming over HTTP (DASH) media presentation description (MPD), and wherein the audio objects are signaled as Adaptation Sets in the DASH MPD.

27. The device of claim 25, further comprising a network interface implemented configured to receive one or more of a single program stream conforming to MPEG-2 Transport Streams (TS) including the audio objects, multiple program streams conforming to MPEG-2 TS including the audio objects, or one or more MPEG Media Transport (MMT) assets comprising the audio objects.

28. The device of claim 25, wherein the audio data processing unit is further configured to use the manifest file to determine, for each of the audio adaptation sets:
whether the audio adaptation sets comprise a fully presentable audio presentation having a specific identifier (ID);
whether the audio adaptation set depends on one or more other audio adaptation sets and, when the audio adaptation set depends on one or more other audio adaptation sets, identifiers for the one or more other audio adaptation sets; and
an identifier for the audio adaptation set.

29. The device of claim 27, wherein the audio data processing unit is further configured to retrieve one or more pre-selection elements from the manifest file, the pre-selection elements including one or more of a descriptor for selecting a subset of the audio objects, one or more parameters that can be used for automatic selection, data that indicates required codec capabilities for this pre-selection, a text label for user selection, or a priority value.

30. A device for receiving audio data, the device comprising:
an audio decoder implemented using digital logic circuitry and configured to decode audio data conforming to MPEG-H or AC-4 part 2;
means for receiving a manifest file describing a plurality of audio objects conforming to MPEG-H or AC-4 part 2, wherein the manifest file indicates whether each of the audio objects is available via broadcast, broadband, or both broadcast and broadband;
means for providing the audio stream metadata to the audio decoder;
means for receiving data representative of the plurality of audio objects from the audio decoder in response to providing the audio stream metadata to the audio decoder;
means for receiving selection data indicating which of the audio objects are to be presented;
means for receiving streamed media data including the audio objects based on the selection data, wherein the means for receiving the streamed media data comprises:
means for determining which of the audio objects of the plurality audio objects are to be presented using the selection data;
means for determining, for each of the audio objects that are to be presented, whether the audio object is available via broadcast or broadband using the manifest file; and
means for retrieving each of the audio objects that are to be presented via either broadcast or broadband based on the determination of whether the audio objects that are to be presented are available via broadcast or broadband and from network locations specified in the manifest file; and
means for providing the audio objects indicated by the selection data to the audio decoder.

31. The device of claim 30, wherein the manifest file comprises a Dynamic Adaptive Streaming over HTTP (DASH) media presentation description (MPD), and wherein the audio objects are signaled as Adaptation Sets in the DASH MPD.

32. The device of claim 30, wherein the means for receiving the streamed media data comprise means for receiving one or more of a single program stream conforming to MPEG-2 Transport Streams (TS) including the audio objects, multiple program streams conforming to MPEG-2 TS including the audio objects, or one or more MPEG Media Transport (MMT) assets comprising the audio objects.

33. The device of claim 30, further comprising:
means for determining, from the manifest file for each of the audio adaptation sets, whether the audio adaptation sets comprise a fully presentable audio presentation having a specific identifier (ID);
means for determining, from the manifest file for each of the audio adaptation sets, whether the audio adaptation set depends on one or more other audio adaptation sets and, when the audio adaptation set depends on one or more other audio adaptation sets, identifiers for the one or more other audio adaptation sets; and
means for determining, from the manifest file for each of the audio adaptation sets, an identifier for the audio adaptation set.

34. The device of claim 30, further comprising means for retrieving one or more pre-selection elements from the manifest file, the pre-selection elements including one or more of a descriptor for selecting a subset of the audio objects, one or more parameters that can be used for automatic selection, data that indicates required codec capabilities for this pre-selection, a text label for user selection, or a priority value.

35. A non-transitory computer-readable storage medium having stored thereon instructions that, when executed, cause one or more processors of a receiver device to:
receive a manifest file describing a plurality of audio objects conforming to MPEG-H or AC-4 part 2, wherein the manifest file indicates whether each of the audio objects is available via broadcast, broadband, or both broadcast and broadband;
provide the audio stream metadata to an audio decoder configured to decode audio data conforming to MPEG-H or AC-4 part 2;
receive data representative of the plurality of audio objects from the audio decoder in response to providing the audio stream metadata to the audio decoder;
receive selection data indicating which of the audio objects are to be presented;
receive streamed media data including the audio objects based on the selection data wherein the instructions that cause the processor to receive the streamed media data comprise instructions that cause the processor to:

determine which of the audio objects of the plurality audio objects are to be presented using the selection data;

determine, for each of the audio objects that are to be presented, whether the audio object is available via broadcast or broadband using the manifest file; and retrieve each of the audio objects that are to be presented via either broadcast or broadband based on the determination of whether the audio objects that are to be presented are available via broadcast or broadband and from network locations specified in the manifest file; and provide the audio objects indicated by the selection data to an audio decoder of the receiver device.

36. The non-transitory computer-readable storage medium of claim 35, wherein the manifest file comprises a Dynamic Adaptive Streaming over HTTP (DASH) media presentation description (MPD), and wherein the audio objects are signaled as Adaptation Sets in the DASH MPD.

37. The non-transitory computer-readable storage medium of claim 35, further comprising instructions that cause the processors to receive one or more of a single program stream conforming to MPEG-2 Transport Streams (TS) including the audio objects, multiple program streams conforming to MPEG-2 TS including the audio objects, or one or more MPEG Media Transport (MMT) assets comprising the audio objects.

38. The non-transitory computer-readable storage medium of claim 35, further comprising instructions that cause the processors to use the manifest file to determine, for each of the audio adaptation sets:

whether the audio adaptation sets comprise a fully presentable audio presentation having a specific identifier (ID);

whether the audio adaptation set depends on one or more other audio adaptation sets and, when the audio adaptation set depends on one or more other audio adaptation sets, identifiers for the one or more other audio adaptation sets; and an identifier for the audio adaptation set.

39. The non-transitory computer-readable storage medium of claim 35, further comprising instructions that cause the processors to retrieve one or more pre-selection elements from the manifest file, the pre-selection elements including one or more of a descriptor for selecting a subset of the audio objects, one or more parameters that can be used for automatic selection, data that indicates required codec capabilities for this pre-selection, a text label for user selection, or a priority value.

* * * * *